United States Patent
Butler et al.

(10) Patent No.: US 9,549,319 B1
(45) Date of Patent: Jan. 17, 2017

(54) PRESENCE VERIFICATION WITHIN A WIRELESS ENVIRONMENT

(71) Applicant: AMAZON TECHNOLOGIES, INC., Reno, NV (US)

(72) Inventors: David George Butler, San Jose, CA (US); Richard William Mincher, Cupertino, CA (US)

(73) Assignee: Amazon Technologies, Inc., Reno, NV (US)

( * ) Notice: Subject to any disclaimer, the term of this patent is extended or adjusted under 35 U.S.C. 154(b) by 200 days.

(21) Appl. No.: 14/299,825

(22) Filed: Jun. 9, 2014

(51) Int. Cl.
*H04L 29/00* (2006.01)
*H04W 12/06* (2009.01)
*H04W 24/08* (2009.01)
*H04L 29/06* (2006.01)

(52) U.S. Cl.
CPC ............ *H04W 12/06* (2013.01); *H04L 63/10* (2013.01); *H04W 24/08* (2013.01)

(58) Field of Classification Search
CPC .............................. H04W 74/00; H04B 17/00
USPC ............................................................ 726/4
See application file for complete search history.

(56) References Cited

U.S. PATENT DOCUMENTS 8,874,045 B2 * 10/2014 Chen .................... H04B 17/318
455/553.1
2015/0078229 A1 * 3/2015 Choi .................... H04W 56/001
370/311

* cited by examiner

*Primary Examiner* — Anthony Brown
*Assistant Examiner* — Michael D Anderson
(74) *Attorney, Agent, or Firm* — Lindauer Law PLLC

(57) ABSTRACT

A first device wirelessly transmits beacon frames having distinct identifying contents within each. The first device issues a request to a second device to report what beacon frame contents the second device may have received. The second device sends a response to the first device. The first device analyzes the response in view of the beacon frame contents actually sent, the respective radio-frequency broadcast power of the beacon frames, and so on. Based on the analysis, the first device may determine proximity or other information regarding the responsive other device.

20 Claims, 11 Drawing Sheets

PRESENCE VERIFICATION WITHIN A WIRELESS ENVIRONMENT

BACKGROUND

Many different types of devices use wireless resources to exchange data with each other or to perform various cooperative operations. Methods and apparatus for increasing the security of such wireless functions are continually sought after.

Figure 1:
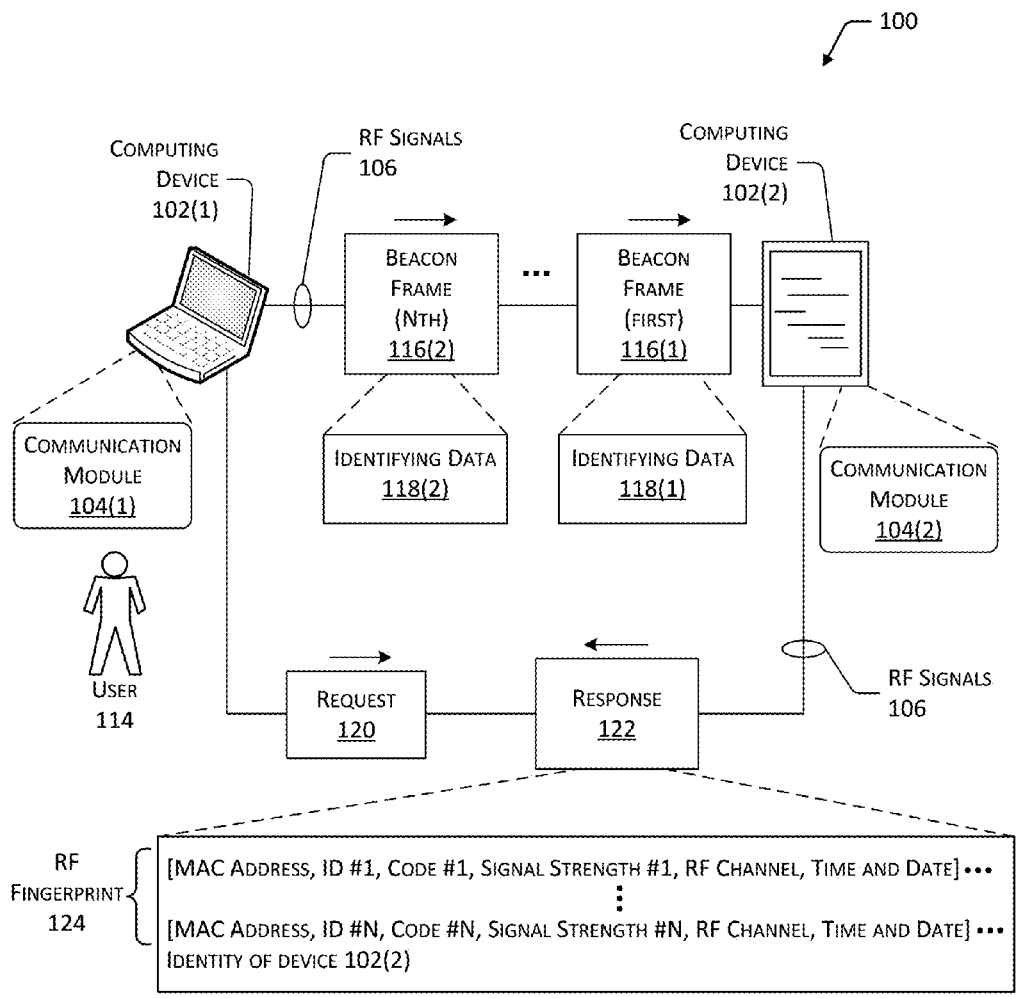
FIG. 1 depicts views including the sending of beacon frames followed by the issuance of a request regarding content of the beacon frames within a wireless signaling environment.
Figure 1:
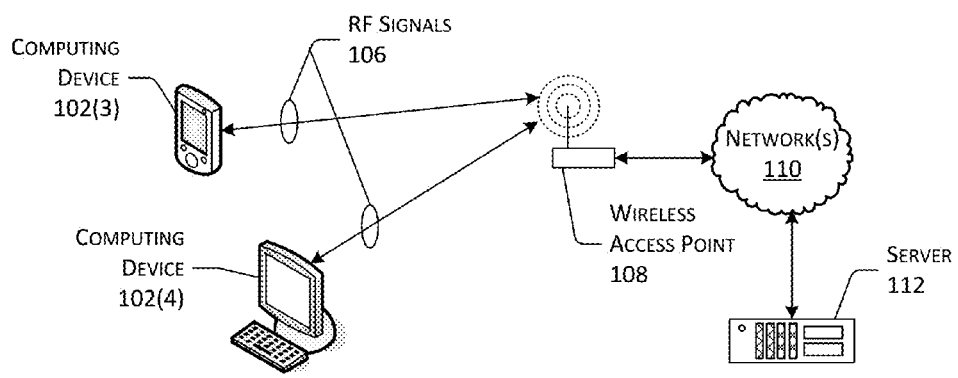

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Many different computing devices or other apparatus include wireless resources for communicating data to other devices, coordinating respective functions during cooperative operations, and so on. Smart phones, tablet computers, wearable computers including those with eyewear- or wristwatch-like form factors, media access or viewing devices, e-book readers, mass data storage devices, wireless access points, and so on, are just a few examples of computing devices which may be connected using a wireless network.

Often, such devices are relatively near to each other during an exchange of files or data, during cooperative operations such as game play, and so forth. For example, a user of a first device may wish to communicate contact information or credit card data to a second device, such as a point-of-sale unit, within a physical merchant retail setting. Thus, the two respective devices are proximate to each other, perhaps separated by just a few feet, prior to the intended exchange. However, the user of the first device may wish to ensure that data is sent securely to the second device and not inadvertently communicated to a potentially malicious actor.

Proximity may be expressed in terms of distance, a common structure, signal strength, and so forth. For example, two devices may be deemed proximate when they are within a distance threshold, such within 10 feet. In another example, the two devices may be deemed proximate to one another when they are located within a common room, building, floor, vehicle, and so forth. In yet another example, the two devices may be deemed proximate when they are able to communicate wirelessly with one another using a lowest available power output during transmission of data.

One illustrative operation for determination of proximity is as follows: the user of the first device provides input requesting verification that the second device is close by. The first device assumes an access point mode and transmits a set of beacon frames. In the set, different beacon frames may be transmitted at respectively different radio-frequency (RF) power output levels. The beacon frames may include different identifying data such as different service set identifiers (SSIDs), a randomly or pseudo-randomly generated code, an arbitrarily selected word or other string, a nonce, or other content that distinguishes one or more of the beacon frames from the other beacon frames.

In another case, a particular beacon frame may be sent two or more times, either consecutively or in a pattern with other, distinct beacon frames. That is, a beacon frame having the same SSID, nonce, or other identifying data may be transmitted more than once within a set. Any suitable number of beacon frames may be transmitted, such as 3, 6, 10, and so forth, over a period of time, using one or more respective RF channels or carrier frequencies in accordance with a particular wireless protocol or standard. A beacon frame contains information that advertises or otherwise discloses availability of a device or a wireless network. Beacon frames may be formatted in accordance with the Institute of Electrical and Electronic Engineers (IEEE) standards 802.11, such as those applying to a wireless local area network (WLAN). For instance, signaling protocols such as Wi-Fi® or Bluetooth® may be used. In one example, beacon frames are transmitted by an access point (AP) within an infrastructure basic service set (BSS). Other suitable frame or packet formats may also be used.

As used herein, a nonce refers to an arbitrary number, word, code, string, or other data that is used on a limited basis within a beacon frame. In some implementations, a particular nonce is used one time and never again. The nonce may be randomly or pseudorandomly generated or selected. The nonce may be used to ensure that previously sent beacon frames or other communications cannot be exploited in a replay attack. The variability afforded by the nonce increases the difficulty for a malicious party to form an illegitimate response.

The first device then issues a request to the second device, requesting that the second device provide data, or an "RF fingerprint", corresponding to one, some, or all of the beacon frames. For instance, the request may instruct the second device to provide an RF fingerprint including at least a portion of the specific identifiers or nonces sent in each of the beacon frames, and to provide received signal strength indications (RSSIs) for each of the beacon frames. The request may also specify other criteria for inclusion in the RF fingerprint, such as SSIDs or other data transmitted by sources other than the first device. Other request criteria may include a specified time span, request particular ones of the beacon frames for inclusion in the response, and so forth.

A request may specify information regarding the content or particular portions of the content of one or more beacon frames sent by a device issuing the request. The information sent from a device in response to the request may be used to make a determination regarding the proximity of the respondent device, whether or not the respondent device is part of a local network, and so on.

The second device then sends a response, or response data, to the first device in accordance with the request. The response data may include the specified RF fingerprint, or other data, that the first device compares to content of the original beacon frames or corresponding portions thereof. For instance, the first device may verify the SSIDs, nonces, or other identifying data of the RF fingerprint that match those sent in the beacon frames. Identifying data may be data, codes, numerical or textual strings, or other suitable elements included within and used to identify respective beacon frames. Some identifying data may be included only once, such as a nonce, for purposes of providing a unique identifier within one corresponding beacon frame. Other identifying data may be used within plural beacon frames to identify those corresponding to a set, those beacon frames sent on a particular date, or in accordance with some other scheme.

The first device may also evaluate the RSSIs or other signal strength values of the response data in view of the actual RF powers used to send the respective beacon frames so as to estimate proximity of, or distance to, the second device. RF signal strength or amplitude decreases over distance in accordance with the inverse-square law, RF energy reflecting or absorbing objects located along the intervening path, gain of the antennas or other RF components, or other factors. Proximity of a second device to a first device may be determined in accordance with RF signal strength loss over distance. By comparing the RSSI reported by the second device with the actual RF broadcast power used by the first device, the distance between the first and second devices may be estimated using one or more predetermined RF signal path loss functions or models, RF signal decay functions, or other techniques. Respective differentials of the reported and actual RF output powers, or their respective arithmetic signs, may also be used. Such a model or function may accept RF powers or RSSIs, or both, as inputs and estimate a distance as an output.

In one implementation, operation of the following general form may be used: a first differential may be calculated as a first RF output power minus a second RF output power. A second differential may be calculated as a first RSSI minus a second RSSI. The first differential and the second differential have first and second arithmetic signs (signs) that are positive or negative, respectively. The second sign may match the first sign when the response data includes RSSIs that correctly correspond to the actual used RF output powers. That is, the first sign may be used for testing the validity of the second sign.

For example, first and second beacon frames may be sent at RF output powers of 20 units and 60 units, respectively. The first differential is then: (20−60)=−40, resulting in a negative first sign. The corresponding RSSIs in the response data may be 18 units and 55 units, respectively. The second differential is then: (18−55)=−37, for a negative second sign. The second sign is consistent with the first sign, and thus consistent with a valid response.

The magnitudes of the RF output powers and the RSSIs may also be used to estimate distance, such as: difference value=((first scaling factor)×(magnitude of RSSI)−(magnitude of RF output power)); and then: distance=(second scaling factor)×(difference value). Scaling factors may be selected so as to normalize or calibrate RSSI values with respect to corresponding RF output power values. Other techniques or mathematical functions may also be used to determine a correspondence between the relative or absolute values of the RF output powers and the RSSIs.

In one regard, proximity of the second device may be determined in terms of quantified distance steps or bins, such as within zero to five feet, within five to ten feet, within ten to fifteen feet, and so on. In another instance, proximity may be determined in more general terms, such as "present" or "not present" within a room or space of interest. In yet another instance, proximity may be measured in terms of distance plus-or-minus some tolerance value, such as seventeen feet plus-or-minus one foot. Other definitions or schema for designating proximity of a device relative to another device may also be used.

Using these and other verification techniques, the first device may determine that the second device has reported all (or a threshold amount) of the beacon frame contents, including those sent at relatively low RF power levels. The first device may also evaluate whether or not the sequence of magnitudes of the reported signal strength values correspond to the respective RF powers used during transmission. In particular, the first device may estimate proximity of the second device in terms of units of distance based on the reported-versus-sent RF signal strengths. These and other techniques may be used to determine a "confidence value" or other indication of certainty that the first device has with respect to the proximity or other security-related characteristics of the second device.

The first device may thus determine if the second device is deemed sufficiently secure to continue the present retail transaction. The first device may then communicate user contact information or credit card data to the second device, or may withhold some or all data, if the confidence value or estimated proximity casts doubt on the second device. Encryption or other security measures may also be employed in view of the confidence value or estimated proximity. Other operations may also be considered. For instance, the second device may send its own sequence of beacon frames, thereafter challenging the first device, such that active, two-way verification has been performed.

In another illustration, a first device may passively receive wireless or RF signals over a period of time, as being transmitted over one or more bands or channels. The first device may store first RF data indicative of content or other characteristics of the received RF signals, such as SSIDs, RSSIs, particular addresses or other identifying data or data elements, and so forth. Timestamps for the respective RF signals may also be generated by the first device and stored with the RF data. Timestamps may include information indicative of one or more of date, time of day, processor tick, and so forth.

The first device may then issue a request to one or more other devices to provide their own RF data for the time period of the reception, or a portion thereof. Such a request may also specify that respondents need not provide RF data corresponding to their own wireless transmissions. For purposes of a present example, a second device and a third device may respond to the request, submitting second and third RF data, respectively, to the first device. The first device may then compare the first RF data to the second RF data and determine a confidence value for the second device, accordingly. The first device may then compare the first RF data to the third RF data, determining a confidence value for the third device, as well.

In one instance, the first device may receive a particular RF signal, or a plurality of different RF signals, during a particular period of time. Such received events may then serve to trigger the issuance of a request to the second and third devices. That is, the first device may receive RF signals from one or more RF channels, and then issue a request to one or more other devices in response to a particularly interesting or complex RF signal, or an intensity of RF signal activity above a predetermined threshold. In this way, requests to other devices may be triggered in accordance with received RF signals that provide an adequate basis for testing and validation, while avoiding the issuance of requests corresponding to minimal or non-existent received RF signal content.

The first device may determine that the second and third devices are likely proximate to the first device when RSSIs or similar signal strength values for all three RF data sets are comparable. In another instance, the first device may determine that the second device is remote when the second RF data includes relatively weak RF signals sent from the first device, RF signals that were not detected by the first device at all, or a combination thereof.

In another instance, the first device may determine an intersection of information expressed in the first RF data and the second RF data, and an intersection of the first RF data and the third RF data. For example, the first device may determine or count the number of data elements that are common to the first and second RF data. Data elements may be any particular data or portions of the RF data, and may include SSIDs, nonces, identifiers, RSSIs, numerical values, strings, words, graphical objects, and so forth. The first device may then calculate or assign respective confidence values to the second device and the third device as functions of the respective intersections.

In yet another instance, the first device may adjust the second or third RF data, or both, in accordance with a tolerance value, prior to determining an intersection or performing some other comparative operation. For instance, a tolerance value in time unit, such as milliseconds, may be added or subtracted from one or more timestamp values provided in one or more of the RF data. In this way, clock drifts or timestamp differentials in the respective RF data sets may be compensated for or "filtered out". Other analytical techniques, calculations, determinations, or conclusive reasoning may also be used.

Thus, a particular device having wireless capability may use RF signals actively or passively, or both, in order to evaluate the security risk of other devices within wireless range. The device may transmit wireless signals as a number of beacon frames having unique identifiers or other contents, wherein the beacon frames are sent at respective RF power levels using one or more RF channels. Additionally or alternatively, the device may receive RF signals issued from other sources for a period of time and record corresponding RF data regarding their contents, measured signals strengths, and so on.

The device may then request other devices to provide data or an RF fingerprint corresponding to some or all of the respective beacon frames' content, including identifier codes, nonces, and so on. Also, such a request may call for RF data corresponding to other RF signals received by the other devices. Responses from one or more other devices may then be evaluated as to reported beacon frame contents, signal strength values or RSSIs, received RF data, sequence or order of the reported contents, time and date correspondences, and so on.

The requesting device may determine respective confidence values, proximities, or other metrics regarding the responding devices. The requesting device may then determine the extent to which it will share respective kinds of data with the other devices, participate in cooperative operations, and so on, according to the determined confidence values, proximities, a predefined security policy or policies, or other criteria. The requesting device may further conclude or infer, based on the determined proximities or other analysis, that some or all of the respondent devices are part of a group located or present within a room, space, or area of concern, that some or all of the respondent devices are likely members of the same wireless network, and so on. Thus, the requesting device seeks to verify the presence of one or more respondent devices within an area or space of interest.

Illustrative System

FIG. 1 depicts views 100 of a system including particular elements and operations performed by each. The views 100 are illustrative and non-limiting in nature, and other elements, devices, systems, or respective operations are also contemplated.

A computing device 102(1) is depicted as a laptop computer having a portable form factor, and configured to perform various functions in accordance with a computer-executable program code. Other computing device 102 types or configurations, such as e-book readers, wearable computers, media devices, digital cameras, and so forth, may also be used.

The computing device 102(1) includes a communication module 104(1) configured to send and receive data or information by way of radio-frequency (RF) signals 106. The RF signals 106 may be formatted or operate on respective channels in accordance with the Institute of Electrical and Electronic Engineers (IEEE) standards 802.11. For instance, signaling protocols such as Wi-Fi® or Bluetooth® may be used. Wi-Fi® is a registered trademark owned by Wi-Fi Alliance, Austin, Tex., USA. Bluetooth is a registered trademark owned by Bluetooth SIG, Inc., Kirkland, Wash., USA. Other wireless signaling protocols may also be used. The communication module 104(1) may include radio-frequency (RF) circuitry, a processor, or other suitable constituency. Alternatively, the communication module 104(1) may access or control an RF circuit that performs other functions on behalf of the computing device 102(1).

A computing device 102(2) is depicted as a tablet computer, and is configured to perform various functions in accordance with computer-executable program code. The computing device 102(2) includes a communication module 104(2), and is configured to communicate with other devices 102 by way of RF signals 106. A computing device 102(3) is depicted as a smart phone, while a computing device 102(4) is depicted as a desktop computer, both of which are configured to communicate by way of RF signals 106.

Also depicted is a wireless access point 108 that is configured to facilitate the exchange of data or information between the computing devices 102(1)-102(4), with one or more networks 110 or a server 112, or perform other communications-related functions. The wireless access point 108 defines a hub, or centralized node, for a wireless network of which the four computing devices 102(1)-102(4) are respective elements or nodes. Such a wireless network may be used within a home, office setting, retail store, commercial space, or other environment.

Thus, the computing devices 102(1)-102(4) may communicate with each other, access the one or more networks 110 or the server 112, and so on, using RF signals 106 communicated by way of the wireless access point 108. The wireless access point 108 may operate on one or more RF channels or at respective signal strengths, format or encrypt information in particular ways, or perform other operations according to a particular wireless protocol such as Wi-Fi® or Bluetooth®. The computing devices 102(1)-102(4) may also be configured to communicate directly with each other, without directing their RF signals 106 through the wireless access point 108.

However, direct data sharing, cooperative operations, and the like, between respective computing devices 102 gives rise to security concerns regarding remote entities with malicious intent. Therefore, a given computing device 102 may seek assurance that another computing device 102 is reasonably proximate and physically present in a space of interest, and is not an "imposter" operating from a remote location.

One illustrative operation may be performed as follows: a user 114 is using the computing device 102(1) within a waiting area of a doctor's office, and the computing device 102(1) is in communication with the computing device 102(2) using the RF signal 106. The respective computing devices 102(1) and 102(2) have therefore exchanged and accepted identifiers, "names", or other information as needed to address each other. The computing device 102(2) appears, from the perspective of the computing device 102(1), as a patient records entry terminal for the doctor's office. The user 114 has completed a patient information form using the computing device 102(1), and wishes to communicate the completed form to the computing device 102(2) by wireless transmission. However, the user 114 further wishes to verify that the computing device 102(2) is proximate thereto and is thus present in or near to the doctor's office waiting area.

The user 114 then actuates a soft switch within a user interface or provides other user input requesting that the physical presence and proximity of the computing device 102(2) be tested and validated. The communication module 104(1) then assumes an "access point" mode of operation in accordance with the Wi-Fi® protocol and transmits beacon frames 116 of total count "N" using RF signals 106. As depicted, a first beacon frame 116(1) includes identifying data 118(1) such as a media access control (MAC) address, a service set identifier (SSID) or other data, and a randomly or arbitrarily selected code. Identifying data 118 may include various particular data elements, such as MAC or other addresses, nonces, strings, numerical values, words, encoded images or objects, or other data. The first beacon frame 116(1) may be sent on a particular RF channel or carrier frequency. The first beacon frame 116(1) may include additional data elements which may be sent in place of, or in addition to, the illustrative content described above. The first beacon frame 116(1) is also sent at a first RF power level, such as a "greatest" RF power.

Beacon frames 116 may be formatted in accordance with the Institute of Electrical and Electronic Engineers (IEEE) standards 802.11, such as those applying to a Wi-Fi® signaling protocol. In one example, a beacon frame 116 may include a MAC header, a frame body, and a frame check sequence (FCS). The beacon frame 116 may also include identifying data 118 such as codes, nonces, and so on. Information included within a beacon frame 116 may include a timestamp, a beacon interval or timing between consecutive beacon frames 116, and capability information regarding a corresponding apparatus or network 110. Other information may also be included. Additionally, beacon frames 116 may be characterized by the RF power at which they are broadcast, the rate or interval at which beacon frames 116 are sent, and so forth.

Other suitable packets or data that are wirelessly communicated between computing devices 102 may also be considered. Such a packet may include identifying data 118, communicate RF power level at which it was sent, data regarding the computing device 102 or network 110 over which it communicates, and so forth. Various packet contents, formatting, protocols, or characteristics may also be used.

The communication module 104(1) then sends additional beacon frames 116, which may have respective identifying data 118. The identifying data 118 may include the MAC address, nonces, SSIDs, and so forth. The beacon frames 116 may be sent on one or more respective RF channels. The communication module 104(1) then sends beacon frame 116(N), where "N" is an integer value greater than zero. Other content may also be included in the beacon frames 116. The respective beacon frames 116 following the first beacon frame 116(1) are transmitted at successively lesser RF powers ending with the beacon frame 116(N), which is sent at a "lowest" RF power level.

Thus, a total of "N" beacon frames 116 have been transmitted from the computing device 102(1) at "X" different RF power levels, and including "D" different identifying data 118, where "X" and "D" are integer values greater than zero. In some implementations, "N", "X", and "D" may be the same value. The timing or rate of sending the respective beacon frames 116 may be regular, irregular, pseudo-randomly varied, or varied in accordance with a predetermined function or timing scheme. Non-limiting examples of such functions include a logarithmic rise or decay, a power curve, a linear rise or decay, a piece-wise linear or non-linear function, and so forth. In another instance, advertising frames in accordance with a Bluetooth® protocol may be used in place of the beacon frames 116. For other protocols, other frames which are functionally similar to beacon frames 116 or advertising frames may also be used.

The communication module 104(1) may then send a request 120 to the computing device 102(2). The request 120 queries the computing device 102(2) to provide a response 122 including data regarding the beacon frames 116 previously sent. The request 120 may be configured to omit information which may enable the computing device 102(2) to reconstruct or "guess" as to the contents of the beacon frames 116.

A request 120 may require information about the identifying data 118, content, or characteristics of one or more beacon frames 116 sent by a computing device 102 issuing the request 120. The information sent from a computing device 102 in response to the request 120 may be used to make a determination regarding the proximity of the respondent computing device 102, whether or not the respondent computing device 102 is part of a local network, and so on. A request 120 may specify particular data or elements included in one or more respective beacon frames 116 to be reported back from the respondent computing device or devices 102. A request 120 may specify a date or time, RF band or channel, or other parameters regarding RF signal 106 content that may have been passively received by the respondent computing device or devices 102. The computing device 102 issuing a request 120 may then compare RF signal 106 or beacon frame 116 content received or issued by it, against data or RF signal 106 characteristics reported back by another computing device 102 answering the request 120.

For instance, the request 120 may include a query to the effect of "what RF signal content did you receive over the last 2 seconds?", or "what access point identifiers or basic service set identifiers (BSSIDs) have you received in the previous 10 seconds?" Other suitable requests 120 may also be used. The request 120 may further specify that respective signal power levels or RSSIs be provided, that date and timestamps are required, that a sequential order of the received beacon frames 116 be indicated, that the respectively used RF channels be indicated, that RF data regarding RF signals 106 sent by other or background entities be provided, and so forth.

The computing device 102(2) then prepares a response 122 to the request 120. The response 122 data may include data corresponding to each of the beacon frames 116, such as the identifying data 118 included within each, such as MAC addresses, respective identifier values or SSIDs, respective signal strengths or RSSIs, RF channel numbers, respective date and timestamps, and so forth, defining an RF fingerprint 124. The response 122 may also include an identifier for the computing device 102(2). The response 122 may include other data or information as well, in accordance with that specified in the request 120 or in accordance with the RF signal protocol that is being used.

The communication module 104(1) receives the response 122 by way of RF signals 106 and analyzes the content thereof. The analysis may include the communication module 104(1) comparing the respective identifying data 118 or other content within the RF fingerprint 124 with those sent in the beacon frames 116. The comparison may be used to verify that most (or all) identifying data 118 or other content are present. The comparison may include comparing the timestamps of the RF fingerprint 124 with the actual times and date(s) that the beacon frames 116 were sent, and so forth. The communication module 104(1) may further compare the signal strengths or RSSIs of the response 122 with the actual RF powers used to transmit the respective beacon frames 116 to determine a correspondence between a transmit sequence and a reception sequence. In some implementations the comparing may include a regular expression match in which one or more symbols or characters or sequences thereof are determined to be identical. Additionally, the communication module 104(1) may use the signal strengths to estimate a distance to the computing device 102(2) sending the response 122.

The communication module 104(1) may use other analytics, predetermined heuristics, or other techniques for determining a confidence value for the sender of the response 122. For purposes of this example, it is assumed that the response 122 includes essentially all correct identifying data 118 corresponding to the data elements of the beacon frames 116, and that the estimated proximity to the sender is consistent with a location within or near to the doctor's office waiting area.

In another instance, the communication module 104(1) may determine a ratio of a count of the identifying data 118 elements in the response 122, to a count of the identifying data 118 elements in the respective beacon frames 116. That is, determine a ratio of reported-versus-actual identifying data 118. The communication module 104(1) may then determine a confidence value for the computing device 102(2). The confidence value may comprise a ratio of the respective counts, a function of an intersection of the reported and actual identifying data 118 sets, or may be generated in accordance with another technique.

For example, if the respective beacon frames 116 include a total of eight identifiers, and the corresponding response 122 accurately includes six of them, then a reported-versus-actual ratio of 6:8 or 0.75 may be calculated and used as the confidence value. In another example, the identifiers may be weighted in accordance with their respective complexities or other criteria. The weights of those identifiers that are accurately reported in the response 122 may then be summed or processed by way of some other function to determine a confidence value. In yet another example, text strings are included in respective beacon frames 116, such as "ABC", "YX", and "DEFG", as identifiers within the identifying data 118. For instance, the identifier "YX" may correspond to the beacon frame 116 that was sent at the relatively lowest RF power, as a threshold for proximity testing the respondent computing device 102. Those identifiers that are correctly provided in a response 122 are counted, and the count is used to determine a confidence value. If the identifier "YX" is not included in the response 122, then a particular, relatively lesser confidence value may be assigned to the respondent computing device 102. Combinations of these or other techniques may also be used to assign a confidence value to a particular response 122.

The communications module 104(1) thus determines that the sender of the response 122 is likely the computing device 102(2), and the computing device 102(2) is trustworthy with respect to completing the present data transaction. The computing device 102(1), acting on the confidence value and proximity just determined, transmits the completed patient information form to the computing device 102(2).

In the illustrative example just described, the computing device 102(1) transmits identifying data 118, which may include unique or randomly selected identifiers, codes, objects, or other information by way of respective beacon frames 116 directed to another computing device 102(2). The beacon frames 116 are also sent at respectively different RF power levels. The computing device 102(1) then tests the relative security and proximity of the intended recipient computing device 102(2) by issuing a request 120 thereto.

The computing device 102(2) sends a response 122 including an RF fingerprint 124 comprised of some or all of the identifying data 118 or other contents of the beacon frames 116, their respective RF signal 106 strengths, and so on, responsive to the request 120. The computing device 102(1) then compares the RF fingerprint 124 with the contents of the beacon frames 116, compares reported signal strengths or RSSIs, or their relative magnitudes, with the actual RF powers used and their order of use, and so on. The computing device 102(1) then determines or quantifies a confidence value and proximity for the computing device 102(2). The computing device 102(1) may then identify particular data to share or withhold, identify cooperative efforts to participate in or avoid, and so on, in accordance with the confidence value and proximity determined as described above.

Additionally, the confidence value, proximity, or both, may be used in accordance with a policy or policies, or predefined security hierarchies, to identify particular data that may or may not be shared, the cooperative operations that may or may not be performed, and so on. As a non-limiting example, certain data may not be shared if a confidence value of less than 95% for the computing device 102(2) is determined, additional data may be added to the protected data set if a confidence value of less than 90% is determined, and so on. Moreover, particular data may not be shared, or certain cooperative operations may not be performed, if the estimated proximity of the computing device 102(2) is greater than fifty feet, and so on. Other security policies or strategies that are put into effect in accordance with respective confidence value or proximity values may also be used.

In another instance, a user 114 may access one or more RF fingerprints 124 acquired at some time in the past, such as three days ago, while at a certain location like a coffee shop, physical merchant retail location, an airport, or other place of interest. The respective identifiers, SSIDs, RF channels, date and timestamps, RSSIs, or other identifying data 118 or content within the RF fingerprints 124 may be used to verify the presence of the corresponding computing device 102(1) at that place and time. Thus, RF fingerprint 124 or other data acquired in response to a request 120 may also serve to prove whereabouts of the computing device 102(1) for a particular date and time, that the user 114 purchased a certain item at a particular location, and so on.

In one or more examples, respective beacon frames 116 and responses 122 may be communicated by direct RF signals 106 that are not routed through a wireless access point 108. In one or more other examples, beacon frames 116 and responses 122 may be communicated through a wireless access point 108 as a wireless network operation. In still other examples, beacon frames 116, responses 122, or any combination of these, may be communicated to the server 112, where they may be stored as security-related data, compared with prior responses or verifications, and so forth. As such, the server 112 may play a passive or active role in the security process. Other operations may also be performed.

Figure 2:
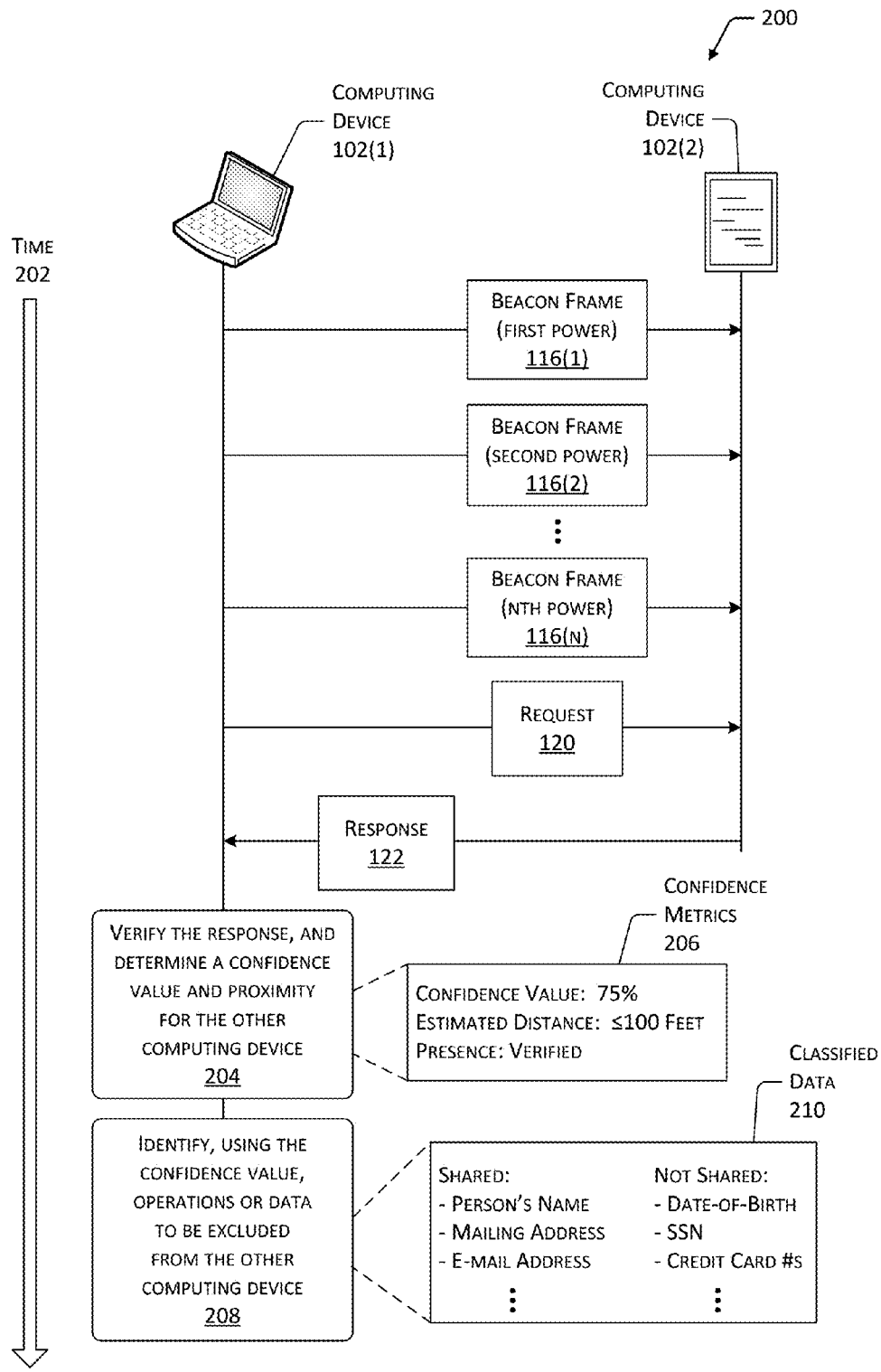
FIG. 2 depicts views of a process flow including sending beacon frames from a first computing device, requesting a response from a second computing device, and the first computing device verifying the response to the request.

FIG. 2 depicts views 200 including a process for verifying a computing device 102(2). As depicted, respective steps are performed over time 202. The views 200 are illustrative and non-limiting in nature. Other implementations, process steps, devices or elements, or variations may also be used.

A computing device 102(1) seeks to determine a confidence value for, and estimate proximity of, another computing device 102(2). The computing device 102(1) may seek to perform this operation in response to a user 114 command, before sharing sensitive data with the computing device 102(2), in accordance with other concerns. The communication module 104(1) of the computing device 102(1) may then assume an "access point" mode so as to perform respective functions of a wireless access point 108 to a wireless network 110.

The computing device 102(1) then sends a beacon frame 116(1) at a first power level, by way of RF signals 106, to the computing device 102(2). The beacon frame 116(1) may include any suitable content, such as an identifier, a nonce, a randomly generated code or selected object, other identifying data 118, and so forth. A nonce may be an arbitrary number, a word, code, a string, an encoded image or sound, or another object that is used on a limited basis within a beacon frame 116. In some cases, a specific nonce is used only once, within a single beacon frame 116, and then never used again. In other cases, a particular nonce is used a limited number of times, and either never used again, or used only for a period of time such as 6 months or a year. Nonces may be used as identifying data 118 in other ways, as well. The computing device 102(1) thereafter sends a beacon frame 116(2) at a second power level different than the first power level. In turn, the beacon frame 116(2) includes an identifier, a nonce, a random or pseudo-random code, or other identifying data 118 that is unique or at least different than that sent in the beacon frame 116(1).

The computing device 102(1) may send additional beacon frames 116 to the computing device 102(2), at respectively different power levels, ending with an Nth beacon frame 116(N). Each of the beacon frames 116(1)-116(N) includes unique or distinct identifying data 118 content such that no two beacon frames 116(1)-116(N) are the same. The respective beacon frames 116 may be sent at consistent or irregular intervals, and so on. Thus, respective timing intervals, or interval differentials, between the beacon frames 116 may provide another characteristic that is subject to verification. One, some, or all of the beacon frames 116(1)-116(N) are received by the computing device 102(2) in accordance with the respective RF power levels used during transmission, the distance or signal attenuating factors between the computing device 102(1) and the computing device 102(2), and so on.

The computing device 102(1) then sends a request 120 to the computing device 102(2), including a query regarding the beacon frames 116(1)-116(N). The query may be formulated in various ways, but the query may be structured such that the computing device 102(2) cannot reconstruct any significant portion of the required response 122 therefrom. That is, the request 120 is formatted to solicit a response 122 from the computing device 102(2) without providing any aid in that regard. In one instance, the request 120 may request that computing device 102(2) provide data or information indicative of changes in identifying data 118 or other content between beacon frames 116 sent at some time in the past, and those beacon frames 116(1)-116(N) just transmitted. Other techniques that test a respondent computing device 102 in accordance with content changes over time, or "differentials", may also be used.

The computing device 102(2) then generates a response 122 that includes data or information regarding the beacon frames 116(1)-116(N), or any respective portions or content of those beacon frames 116 as received by the computing device 102(2). For purposes of a present example, it is assumed that the computing device 102(1) sent a total of three (i.e., N=3) beacon frames 116, and that the computing device 102(2) successfully received the first and last of these: 116(1) and 116(3). Beacon frame 116(2), which was transmitted at the relatively lowest used RF power, was not received by the computing device 102(2).

Accordingly, the response 122 includes identifying data 118 such as SSIDs or other identifiers, random code or object data, nonces, signals strengths or RSSIs, received date and timestamps, and so on, for the two received beacon frames 116. Therefore, the response 122 includes an RF fingerprint 124 corresponding to the beacon frames 116(1) and 116(3). The computing device 102(2) then sends the response 122 to the computing device 102(1) by way of RF signals 106.

At block 204, the computing device 102(1) verifies the response 122 and determines a confidence value for and proximity of the computing device 102(2). The communication module 104(1) may process the response 122 so that the reported data related to the beacon frames 116(1) and 116(3) is compared with the actual contents of those two beacon frames 116 as transmitted. The communication module 104(1) may also note that information corresponding to the beacon frame 116(2) is totally lacking, presumably due to remoteness of the computing device 102(2). Other analytical or heuristic techniques may also be used.

In the present example, the communication module 104(1) notes that the SSIDs, codes, nonces, or other identifying data 118 contents as reported for the beacon frames 116(1) and 116(3) are accurate and complete, and that reported RSSIs are consistent with the actual RF powers used, when accounting for attenuation and distance. The communication module 104(1) then uses the reported RSSIs to estimate that the computing device 102(2) is likely a moderate distance away, perhaps within one hundred feet, and thus is a moderate security risk. In other words, the computing device 102(2) is not likely located across a street or in an adjacent building. For instance, the communication module 104(1) may determine two respective differentials between the actual RF powers used to send the beacon frames 116(1) and 116(3), and the corresponding RSSI values included in the response 122. The communication module 104(1) may then apply a predetermined RF signal loss model or function, access a lookup table that correlates RF signal differentials with respective distances, or use another technique to determine or estimate a distance between the computing device 102(1) and the computing device 102(2). Other processes may also be used.

As depicted, the communication module 104(1) may then determine or quantify a confidence value of "75%", estimated distance of "≤100 feet", and presence "verified", thus defining confidence metrics 206 for the computing device 102(2). For example, proximity may be deemed as when the computing devices 102(1) and 102(2) are at an estimated distance of less than or equal to 100 feet. The confidence metrics 206 are illustrative and non-limiting as to types, conclusions, or quantifications of certainty, or degrees of confidence, that the computing device 102(1) has in regard to the computing device 102(2). Other suitable quantitative scales or ranges, units of measure, degrees of confidence, and so on, may also be used.

At block 208, the computing device 102(1) uses the confidence metrics 206 to identify various data or operations to be excluded from the computing device 102(2). In the present example, the communication module 104(1) identifies general contact information such as a user name or mailing address, an e-mail address, and so on, as data that may be shared with the computing device 102(2). In contrast, the communication module 104(1) identifies certain personal or financial information such the user 114 date-of-birth or social security number (SSN), credit card numbers, and so forth, as data that is not shared with the computing device 102(2), at least under the present circumstances. As depicted, these respective pieces of information collectively define classified data 210.

The process and respective operations described above outline one of several ways in which a first computing device 102(1), illustrated by a laptop computer, may readily generate and transmit data packets, such as beacon frames 116, advertising frames, or other distinct data sending events having unique or randomly generated contents within each. The packets may be transmitted at respectively different RF power levels, using one or more channels, and so on. Thus, the first computing device 102(1) transmits a number of beacon frames 116, advertising frames, or other data packets indicative of the presence of the first computing device 102(1) and characterized by respective codes, identifiers, RF power levels, RF channels, or other aspects that provide a basis for verifying the presence of one or more receiving computing devices 102.

The first computing device 102 then issues a request 120 to a specific other computing device 102, or generally to other computing devices 102 within receiving range, and evaluates any response or responses 122 with respect to reported-versus-sent contents of the data packets, signal strength levels, and so forth. In this way, the first computing device 102 may determine confidence metrics 206 for the responding computing device(s) 102, and use these to identify what data to share or not share, what cooperative operations to join or avoid, and so forth.

Figure 3:
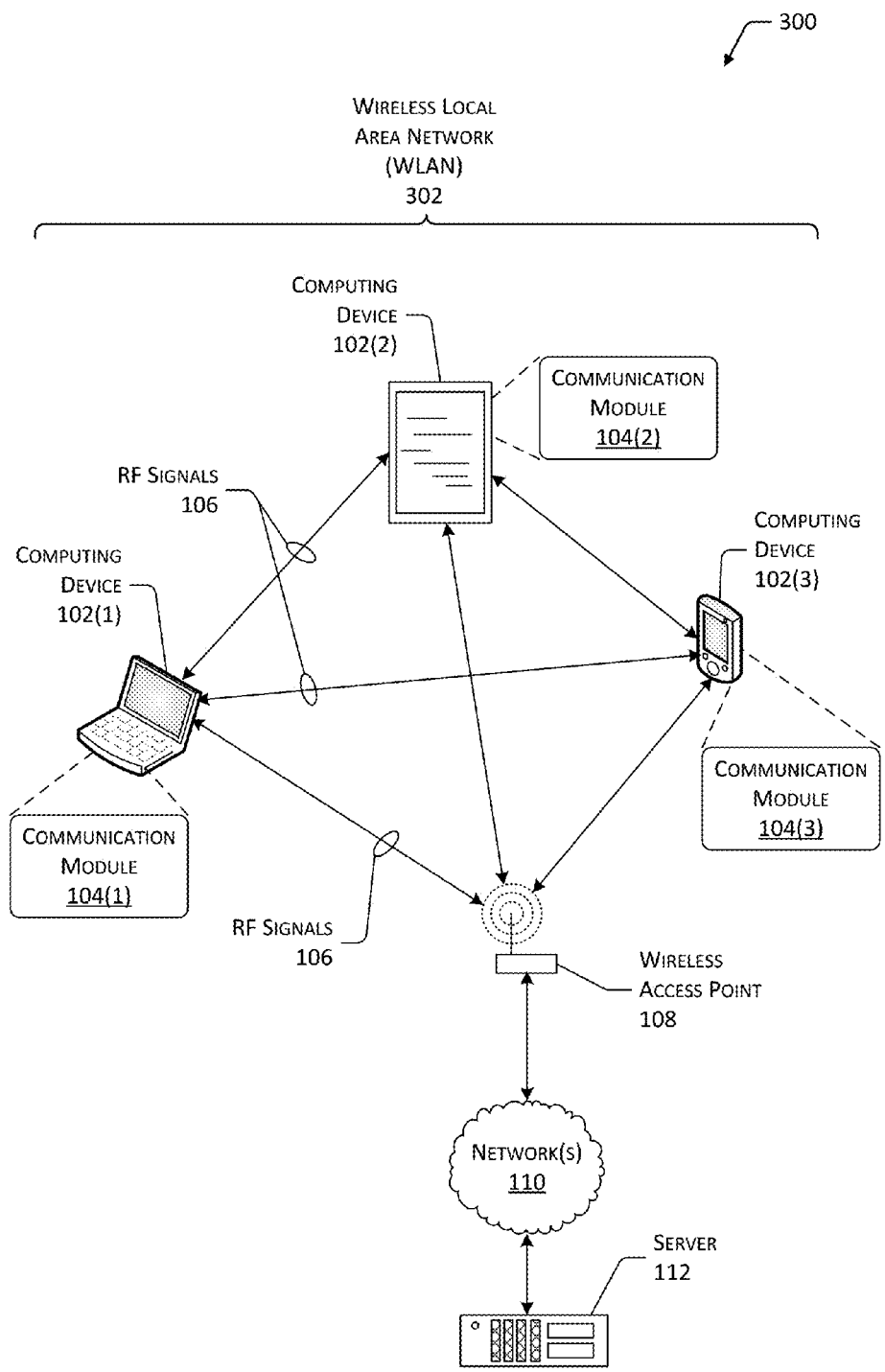
FIG. 3 depicts views of respective computing devices that are members of a wireless network.

FIG. 3 depicts views 300 including respective computing devices 102, a wireless access point 108, and respective operations including one or more of these elements. The views 300 are illustrative and non-limiting, and other elements, details, or operations may also be used.

The respective computing devices 102(1), 102(2), and 102(3) include respective communication modules 104(1), 104(2), and 104(3). Each of the computing devices 102(1)-102(3) is configured to communicate with each other and the wireless access point 108 by way of RF signals 106. In one instance, the RF signals 106 correspond to a Wi-Fi® protocol. In another instance, the RF signals 106 correspond to a Bluetooth® protocol or a cellular communications protocol. Other RF signal 106 formats or protocols may also be used. The computing devices 102(1)-102(3) define respective members or nodes of a wireless local area network (WLAN) 302, wherein the wireless access point 108 functions to couple the computing devices 102 together, maintain WLAN 302 security using encrypted communications or other techniques, and so on.

In some instances, a user 114 of a particular computing device 102 may wish to validate, with a quantified measure of certainty, that the other computing devices 102 coupled to the WLAN 302 are actually located nearby, and that one or more are not imposters that are remotely located. For example, a user 114 of the computing device 102(1) may wish to verify that the computing devices 102(2) and 102(3), which appear to be local by virtue of their connection to the wireless access point 108, are in fact physically nearby. In this way, the user 114 may be assured that data is not shared with, or cooperative operations do not involve, a computing device 102 that is remote and possibly connected to the WLAN 302 for malicious purposes. An illustrative verification operation including elements of the views 300 is described hereinafter with references to FIG. 4 and FIG. 5.

Figure 4:
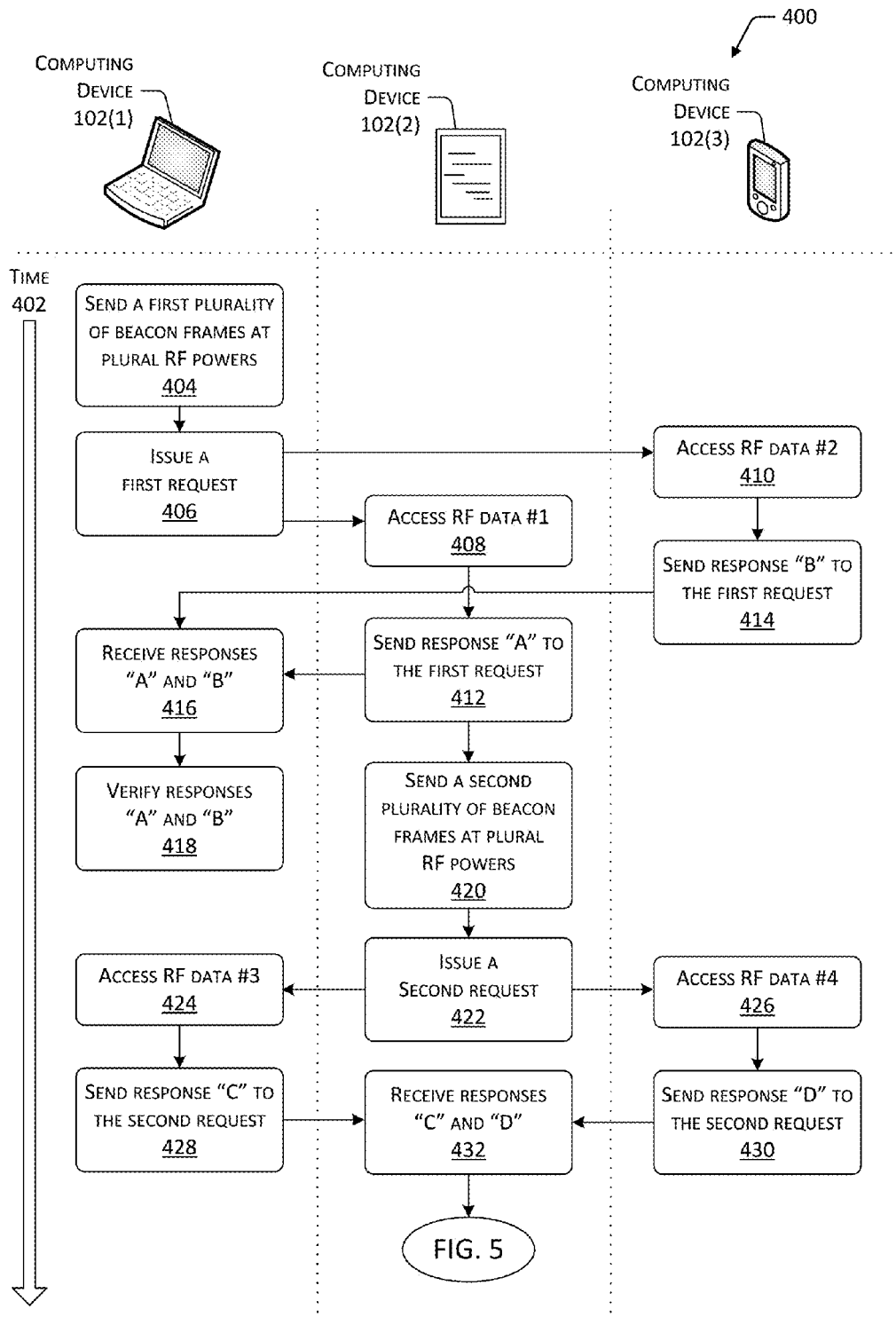
FIGS. 4 and 5 collectively depict views of a process flow including requests and verifications between three respective computing devices in a wireless network.
Figure 5:
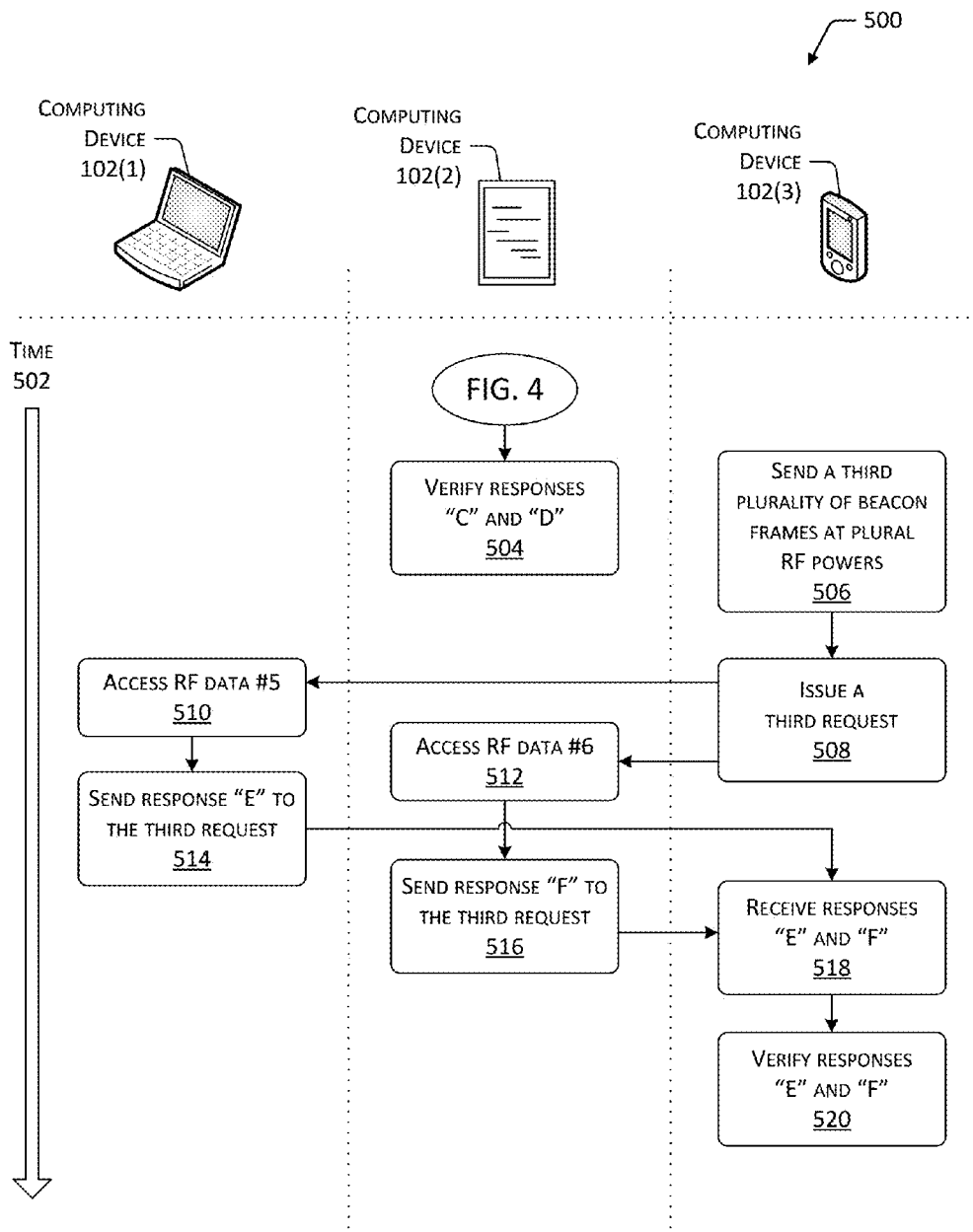

FIGS. 4 and 5 respectively depict views 400 and 500, which collectively include a process for issuing an N-way request to computing devices 102. As depicted, respective steps are performed over time 402-502. The views 400 and 500 are illustrative and non-limiting in nature. Other implementations, process steps, devices or elements, or variations may also be used.

At block 404, the computing device 102(1) sends a first plurality of beacon frames 116 at plural RF powers. For purposes of a present example, the communication module 104(1) assumes an "access point" mode and transmits four respective beacon frames 116(1)-116(4) using RF signals 106. Each of the beacon frames 116(1)-116(4) may include identifying data 118 such as a MAC address, a unique or arbitrarily selected identifier or SSID, a nonce, or other suitable identifiers or content. Each of the four beacon frames 116(1)-116(4) is also sent according to a distinct RF power level, for instance 55%, 70%, 15%, and 90%, respectively, of full RF broadcast power. Notably, the beacon frames 116(1)-116(4) are transmitted directly, and are not communicated through the wireless access point 108.

At block 406, the computing device 102(1) issues a first request 120. In the present example, the computing device 102(1) transmits a first request 120 by RF signals 106, without communicating through the wireless access point 108. The first request 120 may call for each respondent to provide a response 122 that includes identifying data 118 regarding those beacon frames 116 sent by the computing device 102(1). The first request 120 may specify that RSSIs or analogous signal strength values are also required, that date and timestamps should be included, that the received sequence of the beacon frames 116 should be indicated, and so on. The first request 120 may ask for other content or information within a response 122, as well.

At block 408, the computing device 102(2) accesses RF data #1. In the present example, the computing device 102(2) reacts to the first request 120 and accesses RF data #1. The RF data #1 describes identifying data 118 content or characteristics of one or more of the beacon frames 116(1)-116(4), in accordance with those that were received by the computing device 102(2). For instance, the RF data #1 may include the MAC addresses, respective identifiers or SSIDs, nonces, codes, or other content. The accessed RF data #1 may also include respective RSSIs or other signal strength values, date and timestamps, and so forth.

At block 410, the computing device 102(3) accesses RF data #2. In the present example, the computing device 102(3) reacts to the first request 120 by accessing RF data #2. The RF data #2 describes identifying data 118 content or characteristics of one or more of the beacon frames 116(1)-116(4), in accordance with those that were received by the computing device 102(3). Thus, the RF data #2 may include the MAC addresses, respective identifiers or SSIDs, nonces, and so on. The accessed RF data #2 may also include respective RSSIs or other signal strengths, timestamps (include one or more of clock time, date, and so forth), and so on.

At block 412, the computing device 102(2) sends a response 122 "A" to the first request 120. In the present example, the computing device 102(2) uses the accessed RF data #1 to generate an RF fingerprint 124 in accordance with the requirements of the first request 120. Thus, the response 122 "A" may include SSIDs, nonces, random codes or objects, or other identifying data 118 or contents of one or more of the beacon frames 116(1)-116(4). The response 122 "A" may also include date and timestamps corresponding to reception of one or more of the beacon frames 116(1)-116(4), RSSIs, or other data in accordance with the first request 120. The response 122 "A" is then sent from the computing device 102(2) to the computing device 102(1) by direct RF signals 106.

At block 414, the computing device 102(3) sends a response 122 "B" to the first request 120. In the present example, the computing device 102(3) uses the accessed RF data #2 to generate an RF fingerprint 124 in accordance with the requirements of the first request 120. The response 122 "B" may therefore include identifying data 118 such as identifiers or SSIDs, nonces, random codes or object, and so on, of one or more of the beacon frames 116(1)-116(4) as received by the computing device 102(3). The response 122 "B" may also include date and timestamps, RSSIs, or other data in accordance with the first request 120. The response 122 "B" is then sent from the computing device 102(3) to the computing device 102(1) by direct RF signals 106.

At block 416, the computing device 102(1) receives the responses 122 "A" and "B". In the present example, the communication module 104(1) receives the response 122 "A" from the computing device 102(2), and the response 122 "B" from the computing device 102(3). The computing device 102(1) thus has respective RF fingerprints 124, RSSIs, date and timestamps, and so on, as sent in answer to the first request 120.

At block 418, the computing device 102(1) verifies the responses 122 "A" and "B". In the present example, the communication module 104(1) processes the respective responses 122 "A" and "B", comparing the reported-versus-sent identifiers or SSIDs, nonces, random codes, other identifying data 118, and so on, so as to determine if the respective respondent computing device 102(2) has reported back regarding all, some, or none of the beacon frames 116(1)-116(4).

For instance, the response 122 "A" may include accurate data for all but beacon frame 116(3), which was transmitted at the lowest RF power of 15%. Accordingly, the computing device 102(1) may assign a confidence value of 80% to the computing device 102(2). In turn, the computing device 102(1) may estimate the proximity of the computing device 102(2) at about forty feet. Thus, confidence metrics 206 have been determined for the computing device 102(2), from the perspective of the computing device 102(1).

In another instance, the response 122 "B" may include accurate identifying data 118 or other information for all of the beacon frames 116(1)-116(4). The computing device 102(1) may therefore determine a confidence value of 95% for the computing device 102(3), and estimate the proximity of the computing device 102(3) as within twenty feet. Thus, confidence metrics 206 have been determined for the computing device 102(3), from the perspective of the computing device 102(1). Other operations, analytics, or heuristics may be used, or other confidence metrics determined, as well.

At block 420, the computing device 102(2) sends a second plurality of beacon frames 116 at plural RF powers. For purposes of a present example, the communication module 104(2) assumes an "access point" mode and transmits three respective beacon frames 116(5), 116(6), and 116(7) using RF signals 106. Each of the beacon frames 116(5)-116(7) may include identifying data 118 such as a MAC address, a unique or randomly selected identifier or SSID, a nonce, a random code, or other distinguishing content. Each of the three beacon frames 116(5)-116(7) is also sent according to a distinct RF power level, for instance 10%, 75%, and 95%, respectively. The beacon frames 116(5)-116(7) are transmitted directly and are not communicated through the wireless access point 108.

At block 422, the computing device 102(2) issues a second request 120. In the present example, the computing device 102(2) transmits a second request 120 by RF signals 106 that are not sent through the wireless access point 108. The second request 120 may require each respondent computing device 102 to provide a response 122 that includes data regarding those beacon frames 116 sent by the computing device 102(2). The second request 120 may specify RSSIs or analogous signal strength values, timestamps, and so forth, are required.

At block 424, the computing device 102(1) accesses RF data #3. In the present example, the computing device 102(1) reacts to the second request 120 and accesses RF data #3, which describes the identifying data 118, content, or characteristics of one or more of the beacon frames 116(5)-116(7), as respectively received. For instance, the RF data #3 may include the MAC addresses, respective identifiers or SSIDs, nonces, and so on, of one or more of the beacon frames 116(5)-116(7). The accessed RF data #3 may also include respective RSSIs or other signal strength values, timestamps, and so forth.

At block 426, the computing device 102(3) accesses RF data #4. In the present example, the computing device 102(3) reacts to the second request 120 by accessing RF data #4. The RF data #4 describes content or characteristics of one or more of the beacon frames 116(5)-116(7). The RF data #4 may include the MAC addresses, respective SSIDs, other identifying data 118, and so on, as included in the beacon frames 116(5)-116(7) and as respectively received by the computing device 102(3). The accessed RF data #4 may also include respective RSSIs or other signal strengths, timestamps, and so forth.

At block 428, the computing device 102(1) sends a response 122 "C" to the second request 120. In the present example, the computing device 102(1) uses the accessed RF data #3 to generate an RF fingerprint 124 per the requirements of the second request 120. Thus, the response 122 "C" may include identifying data 118 such as identifiers or SSIDs, nonces, random codes or objects, or other content of one or more of the beacon frames 116(5)-116(7) as received by the computing device 102(1). The response 122 "C" may also include date and timestamps, RSSIs, and so on, in accordance with the second request 120. The response 122 "C" is then sent from the computing device 102(1) to the computing device 102(2) by direct RF signals 106.

At block 430, the computing device 102(3) sends a response 122 "D" to the second request 120. In the present example, the computing device 102(3) uses the accessed RF data #4 to generate an RF fingerprint 124 in accordance with the requirements of the second request 120. The response 122 "D" may include identifiers or SSIDs, nonces, random codes, other identifying data 118, and so on, of one or more of the beacon frames 116(5)-116(7). The response 122 "D" may also include date and timestamps, RSSIs, and so on, in accordance with the second request 120. The response 122 "D" is then sent from the computing device 102(3) to the computing device 102(2) by direct RF signals 106.

At block 432, the computing device 102(2) receives the responses 122 "C" and "D". In the present example, the communication module 104(2) receives the response 122 "C" from the computing device 102(1), and the response 122 "D" from the computing device 102(3). The computing device 102(2) thus has the respective RF fingerprints 124, RSSIs, date and timestamps, and so on, as sent in answer to the second request 120.

At block 504, the computing device 102(2) verifies the responses 122 "C" and "D". In the present example, the communication module 104(2) processes the respective responses 122 "C" and "D", comparing the reported-versus-sent identifying data 118, such as identifiers or SSIDs, nonces, random codes, and so on, so as to determine if the respective respondents reported back all or most of beacon frames 116(5)-116(7) contents.

In one instance, the response 122 "C" may include complete and accurate data regarding the beacon frames 116(6) and 116(7), but provides no data corresponding to the beacon frame 116(5) that was sent at an RF power level of 10%. Accordingly, the computing device 102(2) may assign a confidence value of 83% to the computing device 102(1). The computing device 102(2) may estimate the proximity of the computing device 102(2) at about thirty-eight feet. Thus, confidence metrics 206 have been determined for the computing device 102(1) from the perspective of the computing device 102(2).

In another instance, the response 122 "D" may include full and accurate data for the beacon frames 116(5)-116(7). The computing device 102(2) may therefore determine a confidence value of 94% for the computing device 102(3), and estimate the proximity of the computing device 102(3) as within nineteen feet. Thus, confidence metrics 206 have been determined for the computing device 102(3), from the perspective of the computing device 102(2). Other operations, analytics, or heuristics may be used, or other confidence metrics determined, as well.

At block 506, the computing device 102(3) sends a third plurality of beacon frames 116 at plural RF powers. For purposes of a present example, the communication module 104(3) assumes an "access point" mode and transmits four respective beacon frames 116(8), 116(9), 116(10), and 116(11) using RF signals 106. Each of the beacon frames 116(8)-116(11) may include identifying data 118 such as a MAC address, a unique or randomly selected identifier or SSID, a nonce, and so forth. Each of the four beacon frames 116(8)-116(11) is also sent according to a distinct RF power level, for instance 25%, 75%, 95%, and 30%, respectively. The beacon frames 116(8)-116(11) are transmitted directly, and are not communicated through the wireless access point 108.

At block 508, the computing device 102(3) issues a third request 120. In the present example, the computing device 102(3) transmits the third request 120 by RF signals 106, which are not sent through the wireless access point 108. The third request 120 may require each respondent to provide a response 122 including identifying data 118 or other information regarding those beacon frames 116 sent by the computing device 102(3). The third request 120 may specify RSSIs or analogous signal strength values, timestamps, and so forth, as required.

At block 510, the computing device 102(1) accesses RF data #5. In the present example, the computing device 102(1) reacts to the third request 120 and accesses RF data #5, which describes the identifying data 118, content, or characteristics of one or more of the beacon frames 116(8)-116(11), as they were respectively received. For instance, the RF data #5 may include the MAC addresses, respective SSIDs, nonces, and so on, of one or more of the beacon frames 116(8)-116(11). The accessed RF data #5 may also include respective RSSIs or other signal strength values, timestamps, and so forth.

At block 512, the computing device 102(2) accesses RF data #6. In the present example, the computing device 102(2) reacts to the third request 120 by accessing RF data #6. The RF data #6 describes content or characteristics of one or more of the beacon frames 116(8)-116(11). The RF data #6 may include the MAC addresses, respective identifiers or SSIDs, nonces, or other identifying data 118, and so on, as included in the beacon frames 116(8)-116(11) and as respectively received by the computing device 102(2). The accessed RF data #6 may also include respective RSSIs or other signal strengths, timestamps, and so on.

At block 514, the computing device 102(1) sends a response 122 "E" to the third request 120. In the present example, the computing device 102(1) uses the accessed RF data #5 to generate an RF fingerprint 124 according to the requirements of the third request 120. Thus, the response 122 "E" may include identifiers or SSIDs, nonces, random codes or objects, or other content or identifying data 118 of one or more of the beacon frames 116(8)-116(11) as received by the computing device 102(1). The response 122 "E" may also include date and timestamps, RSSIs, and so on, in accordance with the third request 120. The response 122 "E" is then sent from the computing device 102(1) to the computing device 102(3) by direct RF signals 106.

At block 516, the computing device 102(2) sends a response 122 "F" to the third request 120. In the present example, the computing device 102(2) uses the accessed RF data #6 to generate an RF fingerprint 124 in accordance with the requirements of the third request 120. The response 122 "F" may include identifying data 118 such as identifiers or SSIDs, nonces, random codes, and so on, of one or more of the beacon frames 116(8)-116(11). The response 122 "F" may also include date and timestamps, RSSIs, and so on, in accordance with the third request 120. The response 122 "F"

is then sent from the computing device 102(2) to the computing device 102(3) by direct RF signals 106.

At block 518, the computing device 102(3) receives the responses 122 "E" and "F". In the present example, the communication module 104(3) receives the response 122 "E" from the computing device 102(1), and the response 122 "F" from the computing device 102(2). The computing device 102(3) thus has the respective RF fingerprints 124, RSSIs, date and timestamps, and so on, as sent in answer to the third request 120.

At block 520, the computing device 102(3) verifies the responses 122 "E" and "F". In the present example, the communication module 104(3) processes the respective responses 122 "E" and "F", comparing the reported-versus-sent identifying data 118 such as respective identifiers or SSIDs, nonces, random codes, and so on, so as to determine if the respective respondent reported back on all, some, or none of the beacon frames 116(8)-116(11).

For instance, the response 122 "E" may include complete and accurate data regarding all of the beacon frames 116 (8)-116(11). Accordingly, the computing device 102(3) may assign a confidence value of 95% to the computing device 102(1). The computing device 102(3) may estimate the proximity of the computing device 102(1) at about twenty-one feet. Thus, confidence metrics 206 have been determined for the computing device 102(1) from the perspective of the computing device 102(3).

In another instance, the response 122 "F" may include full and accurate data for the beacon frames 116(8)-116(11). The computing device 102(3) may therefore determine a confidence value of 97% for the computing device 102(2), and estimate the proximity of the computing device 102(2) as within eighteen feet. Thus, confidence metrics 206 have been determined for the computing device 102(2), from the perspective of the computing device 102(3). Other operations, analytics, or heuristics may be used, or other confidence metrics determined, as well.

To summarize the foregoing illustration, a 3-way verification process was performed using a total of eleven respective beacon frames 116 and the issuance of three respective requests 120. The computing devices 102(1), 102(2), and 102(3) each received two corresponding responses 122, for a total of six responses 122. These responses 122 were analyzed accordingly, and confidence metrics 206 for the other two computing devices 102 were determined by each computing device 102.

Specifically, the computing device 102(1) determined respective confidence metrics 206 of 80% and forty feet for the computing device 102(2), and 95% and 20 feet for the computing device 102(3). In turn, the computing device 102(2) determined confidence metrics 206 of 83% and thirty-eight feet for the computing device 102(1), and 94% and nineteen feet for the computing device 102(3). Finally, the computing device 102(3) determined confidence metrics 206 of 95% and twenty-one feet for the computing device 102(1), and 97% and eighteen feet for the computing device 102(2).

Each of the computing devices 102(1)-102(3) may now use their respectively determined confidence metrics 206 to identify classified data 210 that may be shared or may not be shared with the other computing devices 102, identify one or more cooperative operations that they may or may not perform involving the other computing devices 102, and so forth. Additionally, each of the computing devices 102(1)-102(3) may determine that the other two computing devices 102(T) and 102(U) are likely present within the same office room, home, commercial floor space, or other area of significance. Thus, each of the computing devices 102(1)-102(3) may independently conclude or infer that all three computing devices 102(1)-102(3) are members of the same group or network. Other conclusions or inferences may also be made.

In the illustrative process described above, the computing devices 102(1)-102(3) perform respective operations in a sequential order in the interest of clarity. However, other processes may be used wherein each computing device 102 performs one or more functions simultaneously or concurrently with those of the other computing devices 102. For instance, the computing devices 102(2) and 102(3) may access their respective RF data #1 and #2, and generate their responses 122 "A" and "B", as independent operations that are performed in a simultaneous or partially simultaneous manner. Other simultaneous or contemporaneous operations may also be considered.

Figure 6:
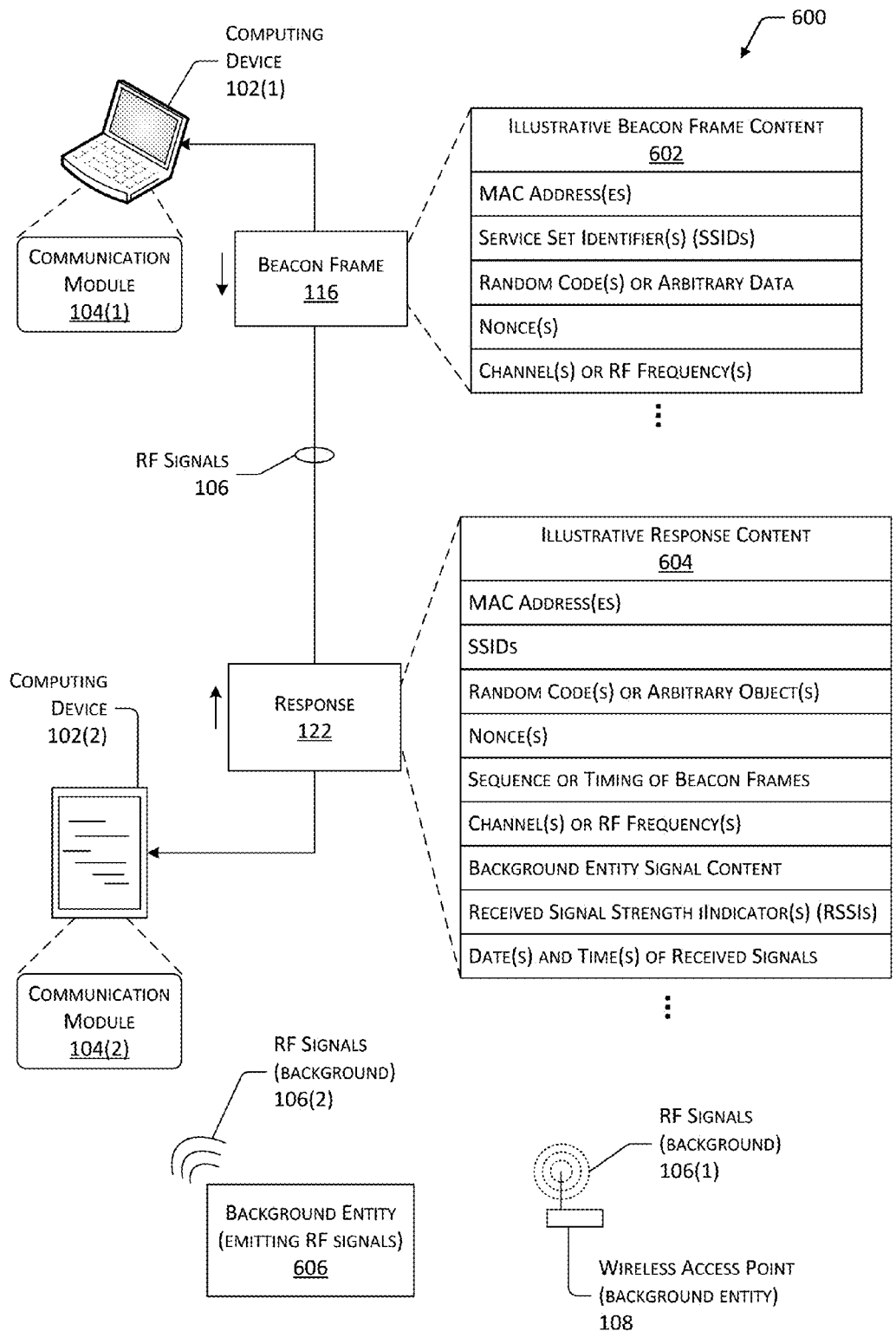
FIG. 6 depicts views of illustrative beacon frame content and illustrative response content.

FIG. 6 depicts views 600 of a system including computing devices 102 and examples of beacon frame 116 contents and response 122 contents that may be wirelessly communicated there between. The views 600 and respective aspects are illustrative and non-limiting in nature, and other elements, devices, operations, or systems may also be used.

As depicted, the computing device 102(1) sends a beacon frame 116 to the computing device 102(2). The beacon frame 116 may include various identifying data 118, information, or other content. Illustrative beacon frame content 602 may include one or more MAC addresses, SSIDs, other identifiers, random codes or objects, a nonce or nonces, and so on. The beacon frame 116 may include other suitable data or contents 602 as well.

For instance, each beacon frame 116 sent by the computing device 102(1) may include a randomly generated object in the form of a pixelated image. For example, graphical objects may be generated at random, or arbitrarily selected from a data structure of predefined graphical objects, for inclusion in respective beacon frames 116. Each beacon frame 116 may include a respective or unique identifier that is other than a numeric, alphanumeric, or symbolic string. Nonetheless, identifiers in the form of words, strings, numerical or symbolic sequences, and so on, may also be used.

As also depicted, the computing device 102(2) sends a response 122 to the computing device 102(1). The response 122 may be sent in answer to a request 120. In some implementations, the request 120 may be omitted. For example, the computing device 102(2) may be configured to generate the response 122 after receiving a previously specified beacon frame 116, at a particular time, upon detection of a particular SSID, and so forth.

The response 122 may include various data, information, an RF fingerprint 124, or other content in accordance with the requirements or specifications of the corresponding request 120. Illustrative response content 604 may include identifying data 118 such as one or more MAC addresses, SSIDs or other identifiers, random codes or objects, a nonce or nonces, and so on, in accordance with content 602 of one or more beacon frames 116 received by the computing device 102(2).

In one implementation, the response 122 may include the RSSI or other signal strength data, timestamps, and so forth. For example, a set of the beacon frames 116 may include the same identifying data 118, but may be transmitted in a particular sequence during which particular beacon frames 116 are transmitted at different power levels. Information indicative of these changes in output power level with respect to the RF signals 106 transmitted comprises a transmission sequence. For example, the transmission sequence may indicate particular beacon frames 116, times intervals, and so forth, along with the RF output power levels used during transmission. In this implementation, the response 122 may include a reception sequence. The reception sequence is indicative of an order in which the beacon frames 116 were received over time. In some implementations, the reception sequence may include RSSI information or other signal strength data. The particular transmission sequence of different RF power outputs transmitted by the computing device 102(1) may thus produce different received signal strengths at the receiving computing device 102(2), which is expressed as the reception sequence in the response 122. The reception sequence may be used as the identifying data 118, or may be used in conjunction with the identifying data 118.

The illustrative response content 604 may also include background entity signal content corresponding, for example, to RF signals 106(1) transmitted by a wireless access point 108 such as a BSSID, RF signals 106(2) transmitted by a background entity 606, and so on. As used in the present example, "background" signals refer to RF signals 106 that are not transmitted by the computing device 102(2), and may be recent, historical, and so on.

Such background RF signals 106(1) or 106(2) may be of interest if the computing device 102(1) passively monitors one or more wireless channels, and then sends a request to the computing device 102(2) regarding content, signal strengths, SSIDs, BSSIDs, timing, or other characteristics of RF signals 106 that were detected during a specific time period. Thus, respective RF fingerprints 124 may include data or values corresponding to background signal sources, as well. Such background RF signal 106(1) or 106(2) data may also serve to demonstrate that a certain computing device 102 was present at a particular place and time.

For instance, the computing device 102(2) may receive RF signals 106 from one or more wireless channels or bands as used for Wi-Fi® or Bluetooth® communication. The computing device 102(2) may then store RF data indicative of content received in the RF signals 106(1) or 106(2), corresponding RSSIs or other signal strength values, timestamps, and so on. The computing device 102(2) may then include such RF data, or portions thereof, in the response 122 in accordance with the specifications of the request 120.

In another instance, respective requests 120 may correspond to, or call for, data or information regarding beacon frames 116 sent at some time in the past, as a way of detecting and excluding more recent eavesdroppers or other remote, potentially malicious respondents. For example, a request 120 may be issued calling for respondents to report on beacon frames 116 that were transmitted two days ago. In another example, a request may require data corresponding to background RF signals 106(1) or 106(2) received one hour prior to the present time, and those detected in the last one minute. Other historical request 120 strategies may also be used.

In yet another instance, the response 122 may also include a digital signature or other identification corresponding to the computing device 102(2). Additionally, some or all of the response 122 may be encrypted in accordance with a scheme specified in the request 120, or as previously established between the respective computing devices 102(1) and 102(2). Moreover, the beacon frames 116, the corresponding response 122, or both, may be formatted or constructed using a hash-based message authentication code (HMAC) based on the nonce as a further measure of security between the respective computing devices 102(1) and 102(2). Other cryptographic or security related techniques may also be used. In some implementations, the nonce values included in the beacon frames 116 may be used during operation of these cryptographic or security related techniques.

Figure 7:
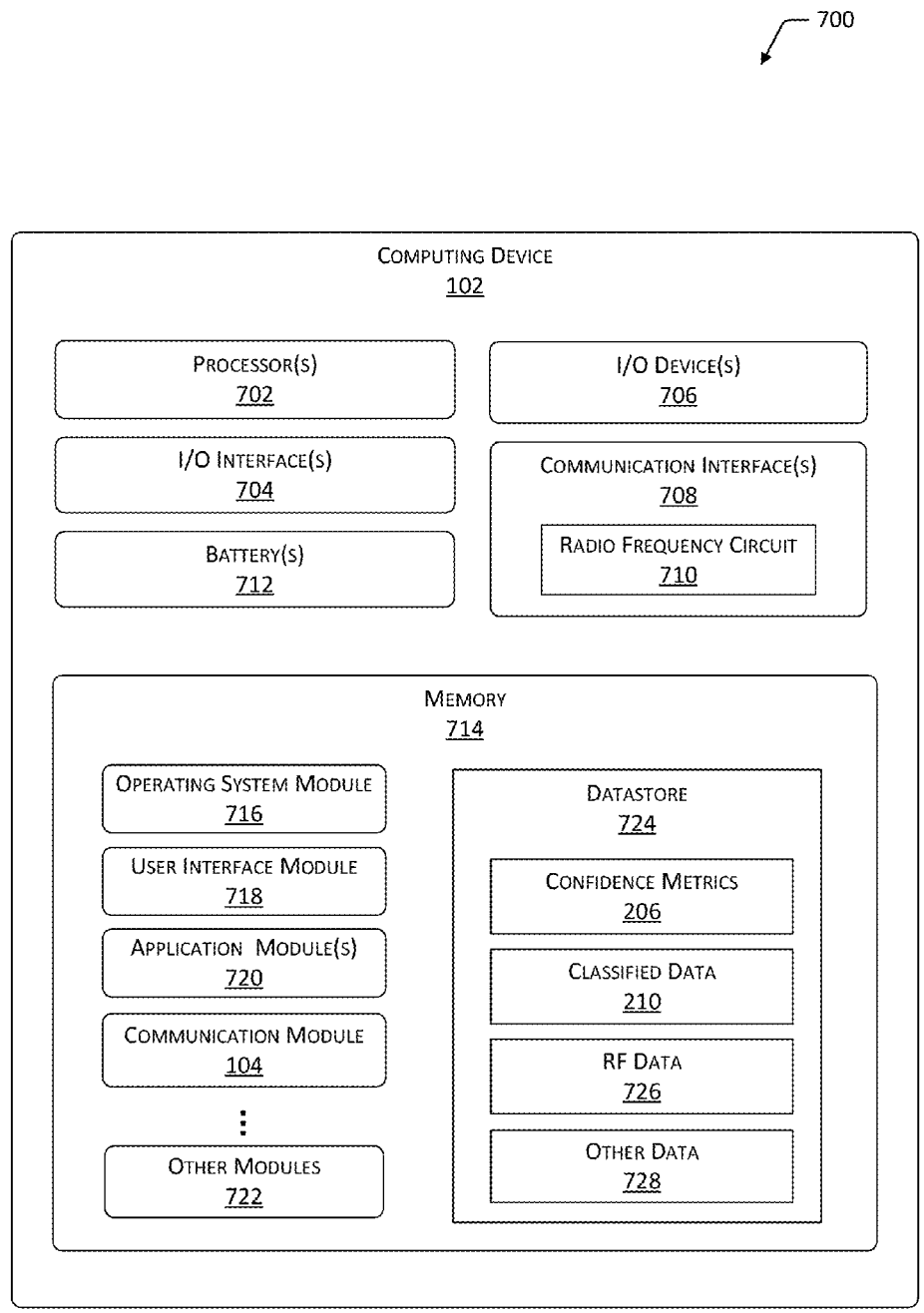
FIG. 7 is a block diagram depicting a computing device.

FIG. 7 illustrates a block diagram 700 of a computing device 102. The computing device 102 is illustrative and non-limiting, and may be defined by a tablet computer, a wearable computer, an e-book reader, a media device, a smartphone, a laptop computer, or another suitable apparatus. The computing device 102 may include one or more processors 702 configured to execute one or more stored instructions. The processor(s) 702 may comprise one or more cores.

The computing device 102 may include one or more input/output (I/O) interface(s) 704 to allow the processor(s) 702 or other portions of the computing device 102 to communicate with various other computing devices 102, the wireless access point 108, the server 112, web-based resources, and so on. The I/O interfaces 704 may include protocols such as inter-integrated circuit (I2C), serial peripheral interface bus (SPI), Universal Serial Bus (USB) as promulgated by the USB Implementers Forum, RS-232, and so forth.

The I/O interface(s) 704 may couple to one or more I/O devices 706. The I/O devices 706 may include one or more input devices such as a keyboard, a mouse, a microphone, a camera, user input buttons, and so forth. The I/O devices 706 may also include output devices such as one or more of a display, audio speakers, haptic output devices, and so on. In some embodiments, the I/O devices 706 may be physically incorporated within the computing device 102, or the I/O devices 706 may be externally placed.

The computing device 102 may also include one or more communication interfaces 708. The communication interfaces 708 are configured to provide communications with other computing devices 102, web-based resources, servers 112, routers, wireless access points 108, and so forth. The communication interfaces 708 may include wireless functions, devices configured to couple to one or more networks 110 including personal area networks (PANs), local area networks (LANs), wireless local area networks (WLANs), wide area networks (WANs), and so forth.

The communication interfaces 708 may also include a radio-frequency (RF) circuit 710, such as a wireless communication interface, configured to communicate RF signals 106 in accordance with Wi-Fi®, Bluetooth®, a proprietary or military "battlefield" protocol, or in accordance with other protocols. The RF circuit 710 may also be configured to receive or "listen" for wireless signal traffic on various bands or channels, measure sensed wireless signal strength values, or perform other functions.

The computing device 102 may also include one or more batteries 712 for providing electrical power during normal operations. The battery or batteries 712 may be rechargeable or disposable in nature. The computing device 102 may also include one or more busses or other internal communications hardware or software that allow for the transfer of data between the various modules and components of the computing device 102.

The computing device 102 includes one or more memories 714. The memory 714 comprises one or more computer-readable storage media (CRSM). The memory 714 provides storage of computer readable instructions, data structures, program modules, and other data for the operation of the computing device 102. The memory 714 may include at least one operating system (OS) module 716. Respective OS modules 716 are configured to manage hardware devices such as the I/O interfaces 704, the I/O devices 706, the communication interfaces 708, and provide various services to applications or modules executing on the processors 702.

Also stored in the memory 714 may be one or more of the following modules. These modules may be executed as foreground applications, background tasks, and so forth. A user interface module 718 may be configured to provide one or more user interfaces, application programming interfaces, textual, graphic or audible instructions or assistance to the user 114, and so forth. The user interface module 718 may be configured to operate with information encoded as hypertext markup language ("HTML") files, extensible markup language ("XML") files, or in another suitable format or language. The user interface module 718 is configured to accept inputs and send outputs using the I/O interfaces 704, the communication interfaces 708, or both.

The memory 714 may also store one or more application modules 720. Non-limiting examples of the application modules 720 include a word processing application, a spreadsheet application, a technical drawing or illustrating application, a web browsing application, a portable document viewing application, and so on. The memory 714 may also include the communication module 104 as described elsewhere herein. The memory 714 may further store one or more other modules 722. Non-limiting examples of the other modules 722 may include cellular or satellite communications circuitry, a watchdog or other timer, a wireless internet receiver, ports or resources for wired communications, and so forth.

The memory 714 may also include a datastore 724 to store information. The datastore 724 may use a flat file, database, linked list, tree, executable code, or other data structure to store the information. In some implementations, the datastore 724 or a portion of the datastore 724 may be distributed across one or more other computing devices 102 or other devices including servers 112, network attached storage apparatus, and so forth.

The datastore 724 may store respective confidence metrics 206 corresponding to one or more other computing devices 102. Such confidence metrics 206 are described and illustrated elsewhere herein. The datastore 724 may also store classified data 210, as identified in accordance with the respective confidence metrics 206. Thus, computing device 102 may have numerous data tables or structures defining what data or operations to share, or not share, with other respective computing devices 102. The classified data 210 is as described and illustrated elsewhere herein. The datastore 724 may also store RF data 726 including respective beacon frame 116 contents, measured values such as RSSIs, date and timestamps, identifiers or SSIDs, contents or data that are acquired during passive monitoring of RF signals 106 on one or more wireless channels, and so forth.

The datastore 724 may also store other data 728. For example, the other data 728 may include computing device 102 identification data such as a serial number or manufacturer, an associated user 114 name or identity, and so forth. The other data 728 may also include predefined SSIDs, nonces, or other objects for use in generating and sending respective beacon frames 116. The other data 728 may further include one or more data structures that may be queried, modified, amended, and so forth.

Accordingly, any particular computing device 102 may be resourced and configured to act in accordance with a "configuration" mode, an "access point" mode, a "station" mode, or two or more of these modes contemporaneously. The computing device 102 may also be configured to send beacon frames 116 in accordance with various regular or irregular rates, so as to request another computing device 102 with respect to its transmission timing, or in accordance with other goals or objectives.

Figure 8:
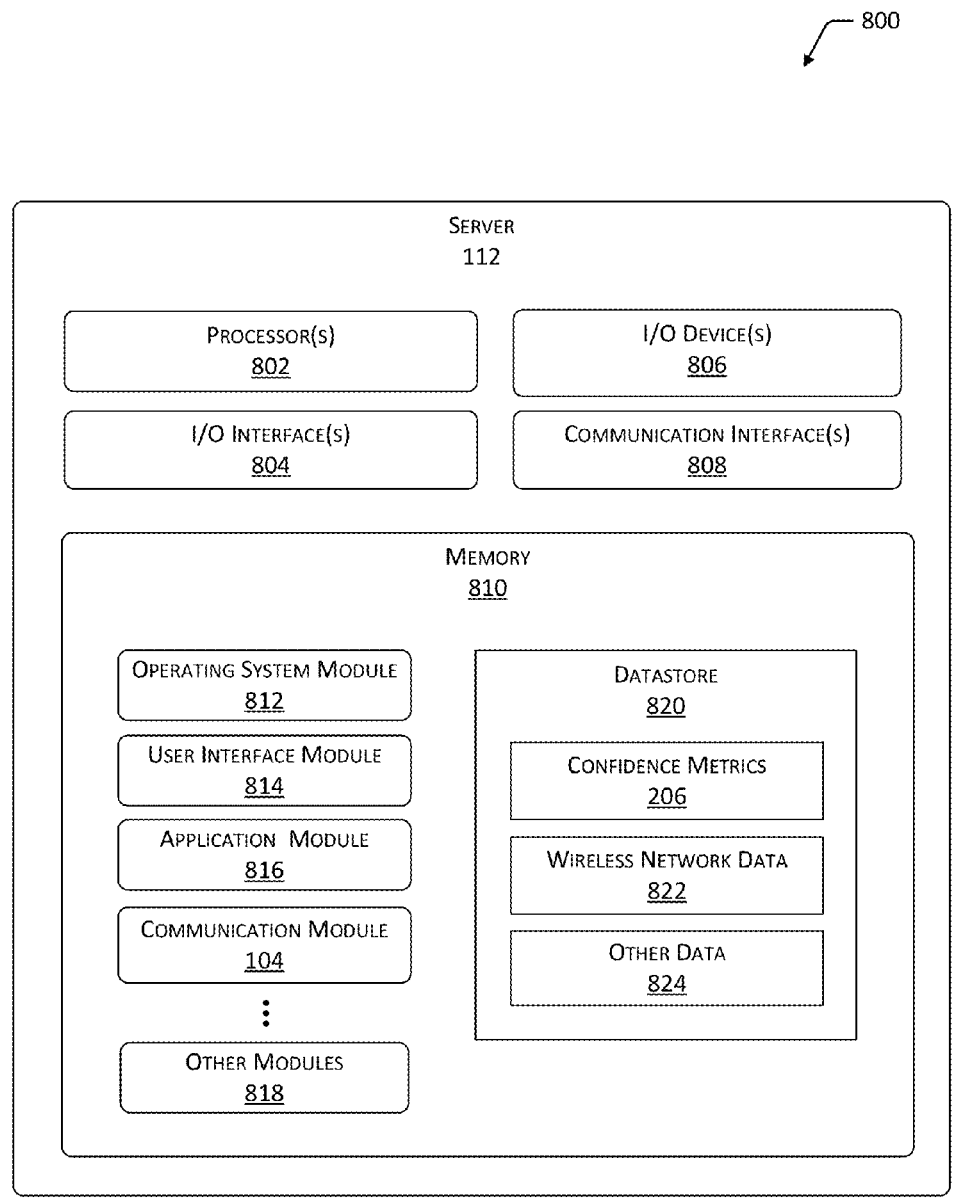
FIG. 8 is a block diagram depicting a server.

FIG. 8 illustrates a block diagram 800 of a server 112. The server 112 is illustrative and non-limiting, and may be defined by a rack-mounted server or another suitable apparatus. The server 112 may include one or more processors 802 configured to execute one or more stored instructions. The processor(s) 802 may comprise one or more cores, and may also be referred to as hardware processors.

The server 112 may include one or more I/O interface(s) 804 to allow the processor(s) 802 or other portions of the server 112 to communicate with various computing devices 102, other servers 112, computing apparatus or systems, web-based resources, and so on. The I/O interfaces 804 may comprise I2C, SPI, USB, RS 232, and so forth.

The I/O interface(s) 804 may couple to one or more I/O devices 806. The I/O devices 806 may include one or more input devices such as a keyboard, a mouse, a microphone, a camera, user input buttons, and so forth. The I/O devices 806 may also include output devices such as one or more displays, audio speakers, haptic output devices, and so forth. In some embodiments, the I/O devices 806 may be physically incorporated within the server 112, or I/O devices 106 may be externally placed.

The server 112 may also include one or more communication interfaces 808. The communication interfaces 808 are configured to provide communications with other servers 112, various computing devices 102, web-based resources, routers, wireless access points 108, and so forth. The communication interfaces 808 may include wireless functions, devices configured to couple to one or more networks 110 including LANs, WLANs, WANs, and so forth. The server 112 may also include one or more busses or other internal communications hardware or software that allow for the transfer of data between the various modules and components of the server 112.

The server 112 includes one or more memories 810. The memory 810 comprises one or more non-transitory CRSM. The memory 810 provides storage of computer readable instructions, data structures, program modules, and other data for the operation of the server 112. The memory 810 may include at least one operating system (OS) module 812. Respective OS modules 812 are configured to manage hardware devices such as the I/O interfaces 804, the I/O devices 806, the communication interfaces 808, and provide various services to applications or modules executing on the processors 802.

Also stored in the memory 810 may be one or more of the following modules. These modules may be executed as foreground applications, background tasks, and so forth. A user interface module 814 may be configured to provide one or more user interfaces. The user interface module 814 may also provide one or more application programming interfaces. The user interface module 814 may be configured to operate with information encoded as hypertext markup language ("HTML") files, extensible markup language ("XML") files, or in another suitable format or language. The user interface module 814 is configured to accept inputs and send outputs using the I/O interfaces 804, the communication interfaces 808, or both.

The memory 810 may also store one or more application modules 816. Non-limiting examples of the application modules 816 include a word processing application, a data encrypting or decrypting application, a data structure generation or management application, a web browsing application, a portable document generating or viewing application, an application for generating one or more web pages, and so on.

The memory 810 may also store the communication module 104, or suitable variant thereof, as described elsewhere herein. The memory 810 may also include one or more other modules 818. Non-limiting examples of the other modules 818 may include, a watchdog or other timer, a wireless internet receiver, secured data handling or encryption/decryption resources, resources supporting Bluetooth® or Wi-Fi® wireless signaling protocols, and so forth.

The memory 810 may also include a datastore 820 to store information. The datastore 820 may use a flat file, database, linked list, tree, executable code, one or more data tables, or another data structure or structures to store the information. In some implementations, the datastore 820 or a portion of the datastore 820 may be distributed across one or more other servers 112 or computing devices 102, network attached storage apparatuses, and so forth.

The datastore 820 may store respective confidence metrics 206 as received from one or more computing devices 102. For instance, the server 112 may function as backup storage for such confidence metrics 206, or may solicit confidence metrics 206 from various computing devices 102 for analytical or security purposes. The datastore 820 may also store wireless network data 822 including data identifying or describing one or more wireless local area networks 302. The datastore 820 may also store other data 824. For example, the other data 824 may include identification data such as serial numbers or identifications for various computing devices 102, a name or identity for a user 114, or other data or encoded values. The other data 824 may also include one or more data structures that may be queried, modified, amended, and so forth.

Figure 9:
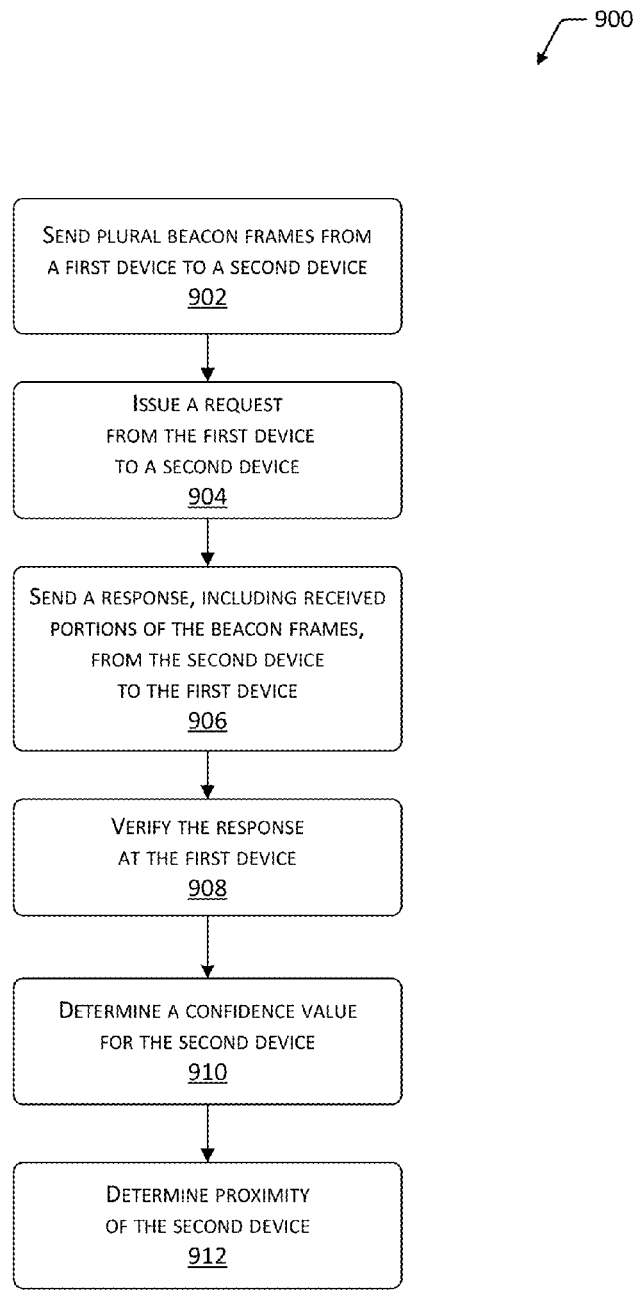
FIG. 9 is a flow diagram of an illustrative process including a first device issuing a request to a second device with respect to the content of a plurality of beacon frames transmitted by the first device.

FIG. 9 is a flow diagram 900 illustrating a process including sending respective beacon frames 116 and issuing a request 120 regarding the content of the beacon frames 116. The process of the flow diagram 900 is illustrative and non-limiting, and other processes including one or more other steps, omitting one or more of the depicted steps, or proceeding in other orders of execution, may also be used.

Block 902 sends plural beacon frames 116 from a first device to a second device. For purposes of a present example, the communication module 104(1) of the computing device 102(1) composes and sends three beacon frames 116, each having some data content, such as illustrative content 602, that is different from the others. The respective beacon frame 116 contents may include identifying data 118 such as distinct SSIDs, words, numerical values, nonces, randomly generated or selected codes or data, and so forth. The beacon frames 116 may also include some data or content in common, such as a MAC address or other information. Each of the three beacon frames 116 is sent at a respective RF power level, for instance 20%, 70%, and 50% of full power, respectively, forming a transmission sequence. In some situations, the combination of contents and RF power levels may be unique. For example, SSID "ABCD" may be used with the RF power level of 20%, while SSID "EFGH" is used with the RF power level of 70%, and so forth. The three beacon frames 116, or some fraction thereof, are received by a computing device 102(2).

Beacon frames 116 may include information that identifies a network 110 or its operating parameters, identifying data 118 such as codes, nonces, and so on. Information included within a beacon frame 116 may include a timestamp, a beacon interval or timing between consecutive frames, and capability information regarding a corresponding apparatus or network 110. Other information may also be included. Additionally, beacon frames 116 may be characterized by the RF power at which they are broadcast, the rate or interval at which beacon frames 116 are sent, and so forth.

Block 904 issues a request 120 from the first device to a second device. In the present example, the computing device 102(1) sends a request 120 to the second device 102(2). The request 120 may request that a respondent device recite any or all identifying data 118 such as SSIDs, identifiers, nonces, and so forth, that were received in the three previously-sent beacon frames 116. The request 120 may also request that particular timestamps regarding the beacon frames 116 also be provided, RSSIs or their analog, and so forth. The request 120 may request other data or information for use in validating the response 122.

In some implementations, the request 120 may be omitted. For example, the second device 102(2) may be configured to detect the beacon frames 116 and respond, such as described next with regard to block 906.

Block 906 sends a response 122, including received portions of the beacon frames 116, from the second device to the first device. In the present example, the computing device 102(2) accesses data or information regarding the three beacon frames 116, as well as any other data requested in the request 120, and prepares a response 122. The response 122 may include an RF fingerprint 124 including identifying data 118, date and timestamp values, RSSIs or other signal strength values, and so forth.

For instance, the computing device 102(2) may have most of the identifying data 118 or other content for the three beacon frames 116, having missed only a nonce and an SSID that were part of the beacon frame 116 that was sent at 20% RF power. Thus, the two beacon frames 116 that were sent at 70% and 50% RF power, respectively, were completely received by the computing device 102(2). The corresponding response 122 is then sent, at 100% RF power, from the computing device 102(2) to the computing device 102(1).

Block 908 verifies the response 122 at the first device. In the present example, the communication module 104(1) of the computing device 102(1) processes the response 122 received from the computing device 102(2). For instance, the identifiers, SSIDs, nonces, and other identifying data 118 content of the response 122 are compared with those actually sent in the respective beacon frames 116, noting that the SSID and the nonce of the lowest-power beacon frame 116 were not included. The respective RSSIs, date and timestamps, and other content of the response 122 are also compared with the actual beacon frame 116 RF power levels, the actual transmit times, and so on. The computing device 102(1) may use other comparisons, analyses, heuristics, or other procedures during the verification of the response 122. For example, the transmission sequence may be compared with the reception sequence.

Block 910 determines a confidence value for the second device. In the present example, the communication module 104(1) of the computing device 102(1) uses the results of the verification at block 908 above to determine a confidence value of 85% for the computing device 102(2). As such, the computing device 102(1) may identify particular data for sharing or withholding from the computing device 102(2), specific cooperative operations that it is willing to perform or avoid regarding the computing device 102(2), and so on, based on the determined confidence value of 85%. Other future decisions or operations may also depend upon the confidence value of the computing device 102(2). A threshold value may be used to specify a minimum confidence value suitable for the use in determining proximity. For example, the threshold value may indicate that the confidence value must be greater than or equal to 80% to determine proximity.

Block 912 determines proximity of the second device. In the present example, the communication module 104(1) uses the results of the verification at block 908 to determine proximity of the computing device 102(2) relative to the computing device 102(1). In particular, the communication module 104(1) may evaluate the RSSIs reported in the response 122 in view of the RF power levels of 20%, 70%, and 50% used to send the respective beacon frames 116. The communication module 104(1) may use various analytical techniques, heuristics, models, tolerance values, estimates of RF signal attenuation for various operating conditions, and so forth to evaluate the RSSIs. Thus, the communication module 104(1) may be configured to adjust for RF signal attenuation, reflections, or other factors using respective compensation values, or tolerances, while determining a proximity to another computing device 102. Here, the communication module 104(1) determines an estimated proximity of sixty feet for the computing device 102(2). The confidence value of 85%, which exceeds the threshold value of 80%, and the estimated proximity of sixty feet collectively define confidence metrics 206 for the computing device 102(2), from the perspective of the computing device 102(1).

Figure 10:
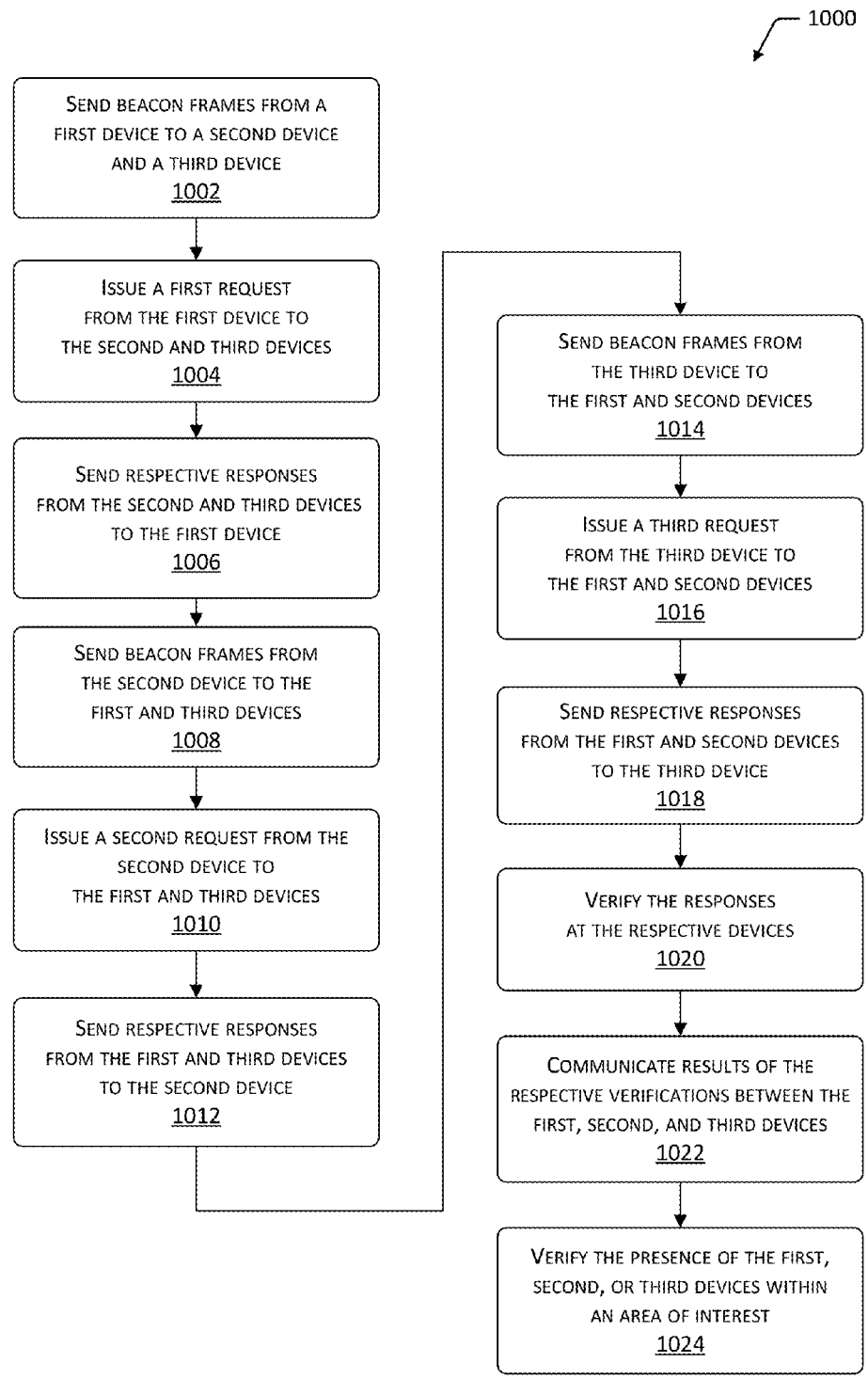
FIG. 10 is a flow diagram of an illustrative process including mutual requests sent between three respective devices regarding respective beacon frames sent by each.

FIG. 10 is a flow diagram 1000 illustrating a process including issuing a three-way request between respective computing devices 102. The process of the flow diagram 1000 is illustrative and non-limiting, and other processes including one or more other steps, omitting one or more of the depicted steps, or proceeding in other orders of execution, may also be used.

Block 1002 sends beacon frames 116 from a first device to a second device and a third device. For purposes of a present example, a computing device 102(1) transmits four respective beacon frames 116, at respectively different RF power levels. Each of the four beacon frames 116 also includes at least one identifier, SSID, nonce, random code or other identifying data 118, or other content that is different than that sent in the other three beacon frames 116. Thus, the four beacon frames 116 have mutually distinct contents. The four beacon frames 116 are sent to a computing device 102(2) and a computing device 102(3), wherein the three respective computing devices 102(1)-102(3) are members of a wireless LAN 302.

In another instance, two or more beacon frames 116 may be sent that have identical identifying contents. In yet another instance, two or more beacon frames 116 may be sent at the same RF power level. Other combinations of content, identifiers, transmission power levels, or other parameters may be used in the interest of comprehensively testing the veracity of another computing device 102.

Block 1004 issues a first request 120 from the first device to the second and third devices. In the present example, the computing device 102(1) transmits a first request 120 to the computing device 102(2) and computing device 102(3), calling for respective responses 122 that describe the four beacon frames 116 just sent. The first request 120 may specify some or all of the content types to be reported, request date and timestamps corresponding to reception of the beacon frames 116, request respective signal strength indicators, and so forth. The first request 120 may specify, request, or require other data or information, as well.

Block 1006 sends respective responses 122 from the second and third devices to the first device. In the present example, the computing device 102(2) may prepare a response 122 "A" in accordance with the beacon frames 116 content received thereby from computing device 102(1). In turn, the computing device 102(3) may prepare a response 122 "B", as well. The two respective responses 122 may include identifying data 118 such as respective SSIDs, nonces, random codes, RSSIs, date and timestamps, and other information in accordance with the specifications of the first request 120. The responses 122 "A" and "B" are then sent to, and received by, the computing device 102(1), where corresponding data is stored for later analysis.

Block 1008 sends beacon frames 116 from the second device to the first and third devices. In the present example, the computing device 102(2) transmits four respective beacon frames 116, at respectively different RF power levels. Each of the four beacon frames 116 includes distinct identifying data 118, such as an SSID, a nonce, and so forth, that is different than the content sent in the other three beacon frames 116. Thus, the four beacon frames 116 are mutually distinct. The four beacon frames 116 are sent to the computing device 102(1) and computing device 102(3).

Block 1010 issues a second request 120 from the second device to the first and third devices. In the present example, the computing device 102(2) transmits a second request 120 to the computing device 102(1) and computing device 102(3), calling for respective responses 122 that describe the beacon frames 116 just sent. The second request 120 may specify particular content types to be reported, request date and timestamps, request signal strength indicators, and so forth. The second request 120 may call for other data or information, as well.

Block 1012 sends respective responses 122 from the first and third devices to the second device. In the present example, the computing device 102(1) may prepare a response 122 "C" in accordance with the beacon frames 116 content received thereby from computing device 102(2). Similarly, the computing device 102(3) may prepare a response 122 "D", as well. The two respective responses 122 may include SSIDs, nonces, random codes, RSSIs, date and timestamps, and other identifying data 118 or information in accordance with the requirements of the second request 120. The responses 122 "C" and "D" are then sent to, and received by, the computing device 102(2), where corresponding data is stored for later analysis.

Block 1014 sends beacon frames 116 from the third device to the first and second devices. In the present example, the computing device 102(3) transmits five respective beacon frames 116, at five mutually different RF power levels. Each of the five beacon frames 116 includes distinct identifying data 118, such as an SSID or other identifier, a random code or nonce, and so forth, which is different than the content sent in the other four beacon frames 116. Thus, the five beacon frames 116 are mutually distinct. The five beacon frames 116 are transmitted to the computing device 102(1) and a computing device 102(2).

Block 1016 issues a third request from the third device to the first and second devices. In the present example, the computing device 102(3) transmits a third request 120 to the computing device 102(1) and computing device 102(2), calling for respective responses 122 that describe the five beacon frames 116 just sent. The third request 120 may specify content types to be reported, request date and timestamps, request RSSIs or other signal strength indicators, and so forth. The third request 120 may also call for other data or information.

Block 1018 sends respective responses 122 from the first and second devices to the third device. In the present example, the computing device 102(1) may prepare a response 122 "E" in accordance with the beacon frames 116 content received thereby from the computing device 102(3). Similarly, the computing device 102(2) may prepare a response 122 "F". The two respective responses 122 may include respective SSIDs, nonces, random codes, other identifying data 118, RSSIs, date and timestamps, and other information in accordance with the requirements of the third request 120. The responses 122 "E" and "F" are then sent to, and received by, the computing device 102(3), where corresponding data is stored for later analysis.

Block 1020 verifies the responses 122 at the respective devices. In the present example, the computing device 102(1) analyzes the respective responses 122 "A" and "B" in view of the actual contents of the four beacon frames 116 sent at block 1002 above. Reported-versus-actual data comparisons, heuristics, or other analytical techniques may be used. For illustration purposes, the computing device 102(1) determines a confidence value of 91% and proximity of twenty-four feet for the computing device 102(2), and a confidence value of 86% and proximity of thirty-seven feet for the computing device 102(3). These confidence values and proximities define two respective sets of confidence metrics 206, from the perspective of the computing device 102(1).

In turn, the computing device 102(2) analyzes the respective responses 122 "C" and "D" in view of the actual contents of the four beacon frames 116 sent at block 1008 above. For illustration purposes, the computing device 102 (2) determines a confidence value of 93% and proximity of twenty-four feet for the computing device 102(1), and a confidence value of 95% and proximity of eighteen feet for the computing device 102(3). These confidence values and proximities define two respective sets of confidence metrics 206, from the perspective of the computing device 102(2).

Finally, the computing device 102(3) analyzes the respective responses 122 "E" and "F" in view of the actual contents of the five beacon frames 116 sent at block 1014 above. For illustration purposes, the computing device 102(3) determines a confidence value of 80% and proximity of thirty-nine feet for the computing device 102(1), and a confidence value of 93% and proximity of eighteen feet for the computing device 102(2). These confidence values and proximities define two respective sets of confidence metrics 206, from the perspective of the computing device 102(3). Thus, the three-way request issued among the computing devices 102(1)-102(3) results in the determination of six respective sets of confidence metrics 206.

Block 1022 communicates results of the respective verifications between the first, second, and third devices. In the present example, respective computing devices 102(1), 102 (2), 102(3) may exchange information or data regarding the verifications that each has performed above. For instance, each computing device 102(1)-102(3) may share the confidence metrics 206 it just determined with the corresponding two other computing devices 102. In another instance, each computing device 102(1)-102(3) may communicate specific data types or operations that will, or will not, be shared or performed with the other computing devices.

Block 1024 verifies the presence of the first, second, or third devices 102 within an area of interest. In the present example, the respective computing devices 102(1), 102(2), and 102(3) may independently verify that the other two computing devices 102 are present within the same room, home, office area, or other area or interest. Such presence verification information may be shared between the computing devices 102(1), 102(2), and 102(3), as well. Other presence verification-related operations may also be performed.

In yet another instance, one or more of the computing devices 102(1)-102(3) will not communicate any information regarding the verifications performed by it, and will simply share or decline data or cooperation on a case-by-case base without advance notice. Other communications between the computing devices 102(1)-102(3) may also be performed.

Figure 11:
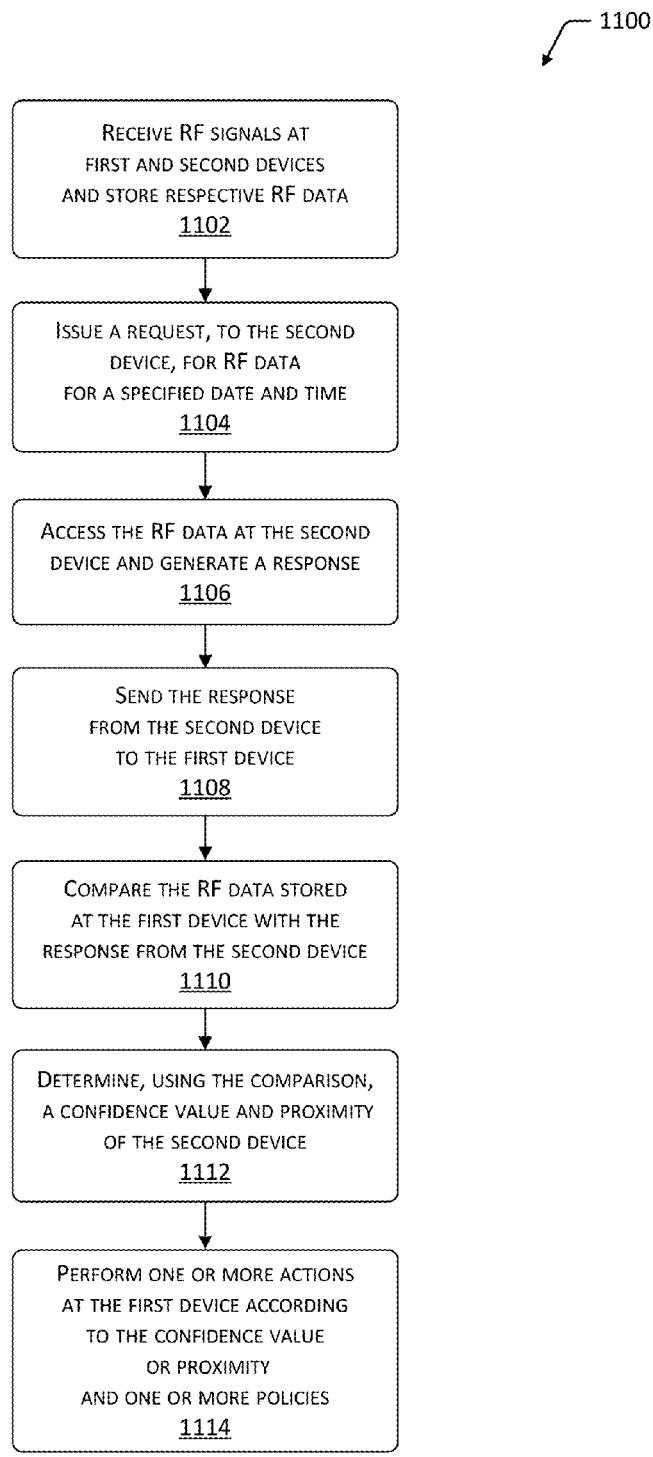
FIG. 11 is a flow diagram of an illustrative process including a first device requesting a response from a second device with respect to passively received wireless signals.

FIG. 11 is a flow diagram 1100 illustrating a process including monitoring RF signals 106 and then issuing a request 120 to another device regarding those RF signals 106. The process of the flow diagram 1100 is illustrative and non-limiting, and other processes including one or more other steps, omitting one or more of the depicted steps, or proceeding in other orders of execution, may also be used.

Block 1102 monitors RF signals 106 at first and second devices. For purposes of a present example, the computing devices 102(1) and 102(2) may respectively receive RF signals 106 on a particular wireless channel, such as being sent by a wireless access point 108, one or more other computing devices 102, or one or more various background entities 606. The contents, data, RSSIs, any beacon frame 116 contents, date and timestamps, channel designation, and so forth, as respectively received may be stored as RF data 726 at the computing devices 102(1)-102(2). Thus, the computing device 102(1) and 102(2) may maintain a respective data structure or log of data or information corresponding to RF signals 106 detected by, but not sent from, the respective computing device 102(1), 102(2), . . . , 102(P).

Block 1104 issues a request 120, to the second device, for RF data 726 for a specified date and time. In the present example, the computing device 102(1) sends a request 120 calling for information or data regarding any RF signals 106 that the computing device 102(2) has received on a specific wireless channel during the past five seconds. For illustration purposes, the computing device 102(1) received three distinct RF signals 106 or "packets", at measured signals strengths of 12%, 45%, and 77%, respectively, during the specified time span and has stored the corresponding RF data 726. Thus, the request 120 is triggered by the three RF signals 106 and is intended to determine what, if any, of those RF signals 106 were also received by the computing device 102(2).

Alternatively, RF signals 106 in a local environment or of other interest may include a common prefix or identifier. For instance, the request 120 may call for information or data regarding the four most recent RF signals 106 that the computing device 102(2) has received, on a specified channel, or which include the particular prefix or identifier. In another example, the request 120 may also require data regarding RF signals 106 that were received by the computing device 102(2) during a time span of two seconds extending back from the time that the request 120 is received. In yet another example, the request 120 may call for data regarding RF signals 106 received by the computing device 102(2) during a time span in accordance with a predetermined time standard or designated time zone. Other requests 120 having other specifications or requirements may also be used.

Block 1106 accesses the RF data 726 at the second device and generates a response 122. In the present example, the computing device 102(2) responds to the request 120 and accesses RF data 726 stored therein. For illustration purposes, the computing device 102(2) received two of the three RF signals 106 corresponding to the specified time span and wireless channel. Specifically, the two RF signals 106, having signal strengths of 12% and 77% as measured by the computing device 102(1), were also detected by the computing device 102(2). Thus, the computing device 102(2) generates a response 122 including data, SSIDs, RSSIs, codes or data, or other content, accordingly.

Block 1108 sends the response 122 from the second device to the first device. In the present example, the computing device 102(2) sends the response 122 as prepared at block 1106 to the computing device 102(1) by way of RF signals 106. Thus, the computing device 102(2) has sent information and data corresponding to two received RF signals 106.

Block 1110 compares the RF data 726 stored at the first device with the response 122 from the second device. In the present example, the computing device 102(1) accesses RF data 726 stored therein corresponding to the three RF signals 106 received during the time span and on the wireless channel specified in request 120. The computing device 102(1) then compares this RF data 726, including SSIDs, RSSIs, codes or data, or other received content, with corresponding portions of the response 122 from the computing device 102(2). For illustration purposes, the computing device 102(1) notes that the response 122 includes data and information regarding two of the three received RF signals 106, but also notes that the RF signal 106 having the relatively lowest measured signal strength of 12% is among the reported data. The computing device 102(1) may use various analytical techniques, compensate or adjust for RF signal 106 attenuation or reflections, apply respective heuristics, and so forth, during the comparison.

Block 1112 determines, using the comparison, a confidence value and proximity of the second device. In the present example, the computing device 102(1) may then use the results of the comparison to generate confidence metrics 206 corresponding to the computing device 102(2). For instance, a confidence value of 84% and an estimated proximity of thirty-two feet may be determined. The computing device 102(1) may also make other inferences or determinations according to the response 122 data, or information missing therefrom.

For instance, the computing device 102(1) may also estimate a direction or location of the computing device 102(2), in accordance with the lack of information corresponding to the RF signal 106 measured at 45% signal strength. The computing device 102(2) may be located in the same general direction as the respective background entities 606 emitting the 12% and 77% signal strength RF signals 106, but may be located in the opposite direction or behind an attenuating object with respect to the background entity 606 emitting the 45% signal strength RF signal 106. Other analytical reasoning or inferences may also be used.

Block 1114 performs one or more actions at the first device according to the confidence value or proximity and one or more policies. In the present example, the computing device 102(1) may use the confidence value of 84% and estimated proximity of thirty-two feet, in accordance with one or more security policies, so as to identify particular data that it is willing to share, or will withhold, from the computing device 102(2). Such data collectively defines classified data 210. The computing device 102(1) may also identify one or more shared or cooperative operations that it is willing to perform, or will avoid, with respect to the computing device 102(2) in accordance with respective security policies. Data or information, corresponding to these or other security-related determinations, or the underlying security policies, may be communicated to the computing device 102(2). Other operations may also be performed.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium, and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A first device configured to:
   send, using a wireless communication interface, a first signal transmitting a first beacon frame at a first radio frequency (RF) power, wherein the first beacon frame includes first identifying data;
   send, using the wireless communication interface, a second signal transmitting a second beacon frame at a second RF power different than the first RF power, wherein the second beacon frame includes second identifying data different than the first identifying data;
   send, using the wireless communication interface, a request to a second device;

receive response data from the second device using the wireless communication interface, the response data including:
the first identifying data;
the second identifying data;
a first received signal strength of the first signal; and
a second received signal strength of the second signal;
determine, by subtracting the second RF power from the first RF power, a first differential having a first arithmetic sign;
determine, by subtracting the second received signal strength from the first received signal strength, a second differential having a second arithmetic sign;
determine the first arithmetic sign and the second arithmetic sign match; and
designate the first device and the second device as physically proximate to one another.

2. The first device of claim 1, further configured to:
receive, using the wireless communication interface, a third signal transmitted by a third device, wherein the third signal includes one or more beacon frames;
generate first RF data indicative of the third signal;
wherein the response data comprises second RF data indicative of the third signal as received by the second device; and
determine at least a portion of the first RF data are present in the second RF data.

3. The first device of claim 1, further configured to:
determine that the first identifying data and the second identifying data are in the response data;
determine that the response data includes one or more of:
a reception sequence indicative of an order in which the first beacon frame and the second beacon frame were received over time,
a time stamp indicative of time of reception of the first beacon frame, the second beacon frame, or both,
a service set identifier (SSID), or
a media access control (MAC) address; and
generate a confidence value corresponding to the second device, wherein the confidence value is indicative of a ratio of information in the response data which corresponds to information sent in the first beacon frame and the second beacon frame.

4. The first device of claim 1, further configured to:
estimate a distance between the first device and the second device using:
data indicative of the first RF power and the second RF power,
the first received signal strength and the second received signal strength as received in the response data, and
a path loss model configured to accept as inputs RF power and received signal strength, and output a distance.

5. A method comprising:
sending a plurality of beacon frames at respective radio frequency (RF) output power levels using a communication interface of a first device, wherein at least some of the plurality of beacon frames include identifying data configured to distinguish one of the plurality of beacon frames from another;
requesting response data from a second device;
receiving the response data from the second device, wherein the response data includes at least a portion of the identifying data as received by the second device;
determining a correspondence between the identifying data included in the response data and the identifying data included in the at least some of the plurality of beacon frames; and
designating the first device and the second device are physically proximate to one another.

6. The method of claim 5, wherein the response data includes a reception sequence indicative of respective signal strength values for one or more of the plurality of beacon frames as received by the second device, the method further comprising:
determining a transmission sequence comprising an ordering of the respective RF output power levels used by the communication interface; and
determining a correspondence between the transmission sequence and the reception sequence.

7. The method of claim 5, wherein the identifying data included in one or more of the plurality of beacon frames comprises at least one or more of a pseudorandom or random value.

8. The method of claim 5, wherein at least one of the identifying data is included in two or more of the plurality of beacon frames.

9. The method of claim 5, wherein:
the identifying data for each of the at least some of the plurality beacon frames sent within a predetermined period of time is different from one another.

10. The method of claim 5, wherein the requesting the response data specifies a time span; and the method further comprising:
determining that the response data corresponds exclusively to the plurality of beacon frames sent during the time span.

11. The method of claim 5, wherein the sending of the plurality of beacon frames is performed in accordance with at least a portion of an 802.11 standard as promulgated by the Institute of Electrical and Electronics Engineers.

12. The method of claim 5, wherein the identifying data for each of the at least some of the plurality of beacon frame comprises service set identifiers (SSIDs).

13. The method of claim 5, wherein:
the plurality of beacon frames are sent at respective transmit times;
the response data comprises time of reception of the identifying data; and
the determining the correspondence comprises a comparison of the respective transmit times with the time of reception.

14. The method of claim 5, further comprising:
determining a first number of data elements included in the identifying data sent in the at least some of the plurality of beacon frames;
determining a second number of data elements included in the identifying data of the response data; and
determining a confidence value comprising a ratio of the second number of data elements relative to the first number of data elements.

15. The method of claim 14, wherein the confidence value is above a threshold level; and further comprising:
providing, to the second device, access to information stored by the first device.

16. The method of claim 5, the method further comprising:
receiving, using the communication interface, RF signals emitted from a source other than the second device;
determining first RF data indicative of the RF signals from the source other than the second device;

receiving, with the response data, second RF data indicative of RF signals from the source other than the second device as received by the second device; and determining one or more matches between the first RF data and the second RF data.

17. The method of claim 16, wherein the first RF data and the second RF data each include one or more signal strength values, the method further comprising:

adjusting the one or more signal strength values of the second RF data using one or more tolerance values to generate adjusted signal strength values;

determining the first device and the second device are proximate to one another using the signal strength values of the first RF data and the adjusted signal strength values of the second RF data.

18. A method comprising:

sending, from a first device, a first set of radio frequency (RF) signals comprising first RF data;

receiving, from a second device, second RF data including content of RF signals received by the second device, wherein the RF signals received include at least a portion of the first set of RF signals;

comparing the first RF data with the second RF data; and designating the first device and the second device are physically proximate to one another.

19. The method of claim 18, further comprising:

sending a request for the second RF data to the second device, wherein the request comprises a time span corresponding to one or more of:

a particular time-of-day in accordance with a time standard; or a period of time extending back from a time that the request is received;

adjusting a time shift of the second RF data relative to the first RF data using a clock drift tolerance value to generate adjusted second RF data; and comparing a portion of the first RF data corresponding to the time span with the adjusted second RF data.

20. The method of claim 18, wherein the first set of RF signals are transmitted at a plurality of power output levels;

determining a transmission sequence comprising information indicative of the plurality of power output levels used during sending the first set of RF signals;

determining a reception sequence comprising information indicative of changes to received signal strength of the at least a portion of the first set of RF signals as received by the second device; and comparing the transmission sequence with the reception sequence.

* * * * *